(12) United States Patent
Oshidari

(10) Patent No.: US 7,404,460 B2
(45) Date of Patent: Jul. 29, 2008

(54) MODE SWITCH CONTROL APPARATUS AND METHOD FOR HYBRID TRANSMISSION

(75) Inventor: Toshikazu Oshidari, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 461 days.

(21) Appl. No.: 11/004,875

(22) Filed: Dec. 7, 2004

(65) Prior Publication Data

US 2005/0133286 A1 Jun. 23, 2005

(30) Foreign Application Priority Data

Dec. 18, 2003 (JP) .............................. 2003-420458

(51) Int. Cl.
*B60K 17/00* (2006.01)
(52) U.S. Cl. ...................................... 180/65.3; 180/344
(58) Field of Classification Search ................ 180/65.1, 180/65.2
See application file for complete search history.

(56) References Cited

U.S. PATENT DOCUMENTS

| 4,126,200 | A | * | 11/1978 | Miller et al. ................. 180/165 |
| 4,393,964 | A | * | 7/1983 | Kemper ........................... 477/6 |
| 5,172,787 | A | * | 12/1992 | Kobayashi .................... 180/197 |
| 5,342,258 | A | * | 8/1994 | Egyed ........................... 475/281 |
| 5,632,354 | A | * | 5/1997 | Kashiwase et al. ........... 180/344 |
| 5,931,757 | A |   | 8/1999 | Schmidt |
| 6,041,877 | A | * | 3/2000 | Yamada et al. .............. 180/65.2 |
| 6,244,368 | B1 |  | 6/2001 | Ando et al. |
| 6,773,368 | B1 | * | 8/2004 | Williames ...................... 475/74 |
| 6,988,572 | B2 | * | 1/2006 | Tatara et al. ................ 180/65.2 |
| 2002/0045507 | A1 |  | 4/2002 | Bowen |
| 2004/0256165 | A1 |  | 12/2004 | Tomita et al. |

FOREIGN PATENT DOCUMENTS

| EP | 0 908 343 A2 | 4/1999 |
| EP | 1 247 679 A2 | 10/2002 |
| JP | 2000-62483 A | 2/2000 |
| WO | WO 03/035421 A1 | 5/2003 |

OTHER PUBLICATIONS

U.S. Appl. No. 10/986,197, filed Nov. 12, 2004, Joe et al.
U.S. Appl. No. 10/982,883, filed Nov. 8, 2004, Joe.
U.S. Appl. No. 11/002,262, filed Dec. 3, 2004, Tsuneyoshi et al.
U.S. Appl. No. 10/980,327, filed Nov. 4, 2004, Imazu et al.

* cited by examiner

*Primary Examiner*—Christopher Ellis
*Assistant Examiner*—Bridget Avery
(74) *Attorney, Agent, or Firm*—Foley & Lardner LLP

(57) ABSTRACT

In mode switch control apparatus and method for a hybrid transmission, both of a torque transmission capacity of one of a predetermined clutch and a predetermined brake which is engaged when a mode switch is carried out and a torque change of one of motor/generators along with a polarity reversal in the one of the motor/generators when the polarity reversal is involved in the motor/generator before and after the mode switch is carried out are mutually interlocked.

7 Claims, 15 Drawing Sheets

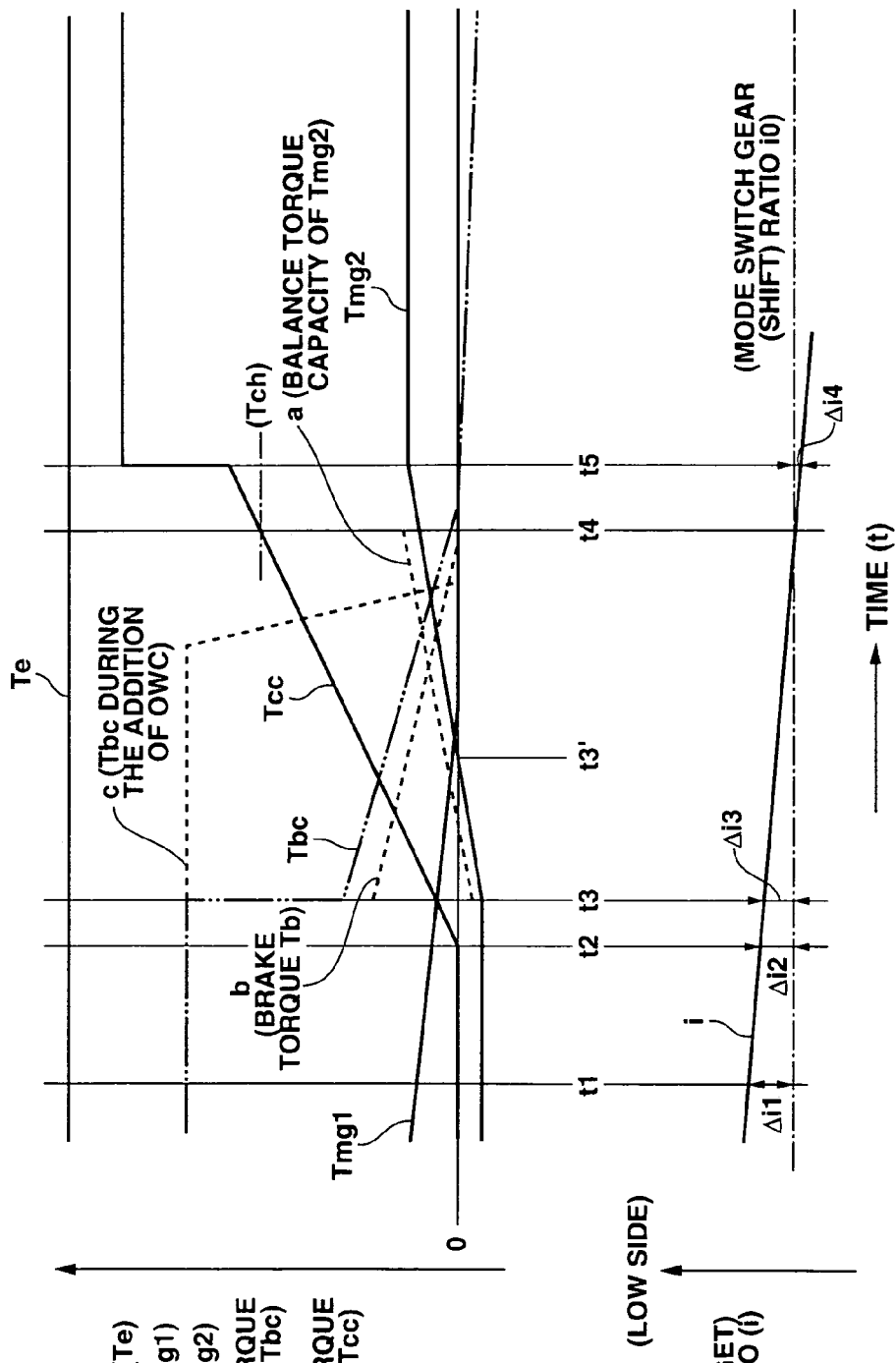

ENGINE TORQUE (Te)
MG1 TORQUE (Tmg1)
MG2 TORQUE (Tmg2)
TRANSMISSION TORQUE CAPACITY OF $B_{LO}$ (Tbc)
TRANSMISSION TORQUE CAPACITY OF Chi (Tcc)

ACTUAL (OR TARGET) GEAR (SHIFT) RATIO (i)
(MODE SWITCH GEAR (SHIFT) RATIO i0)

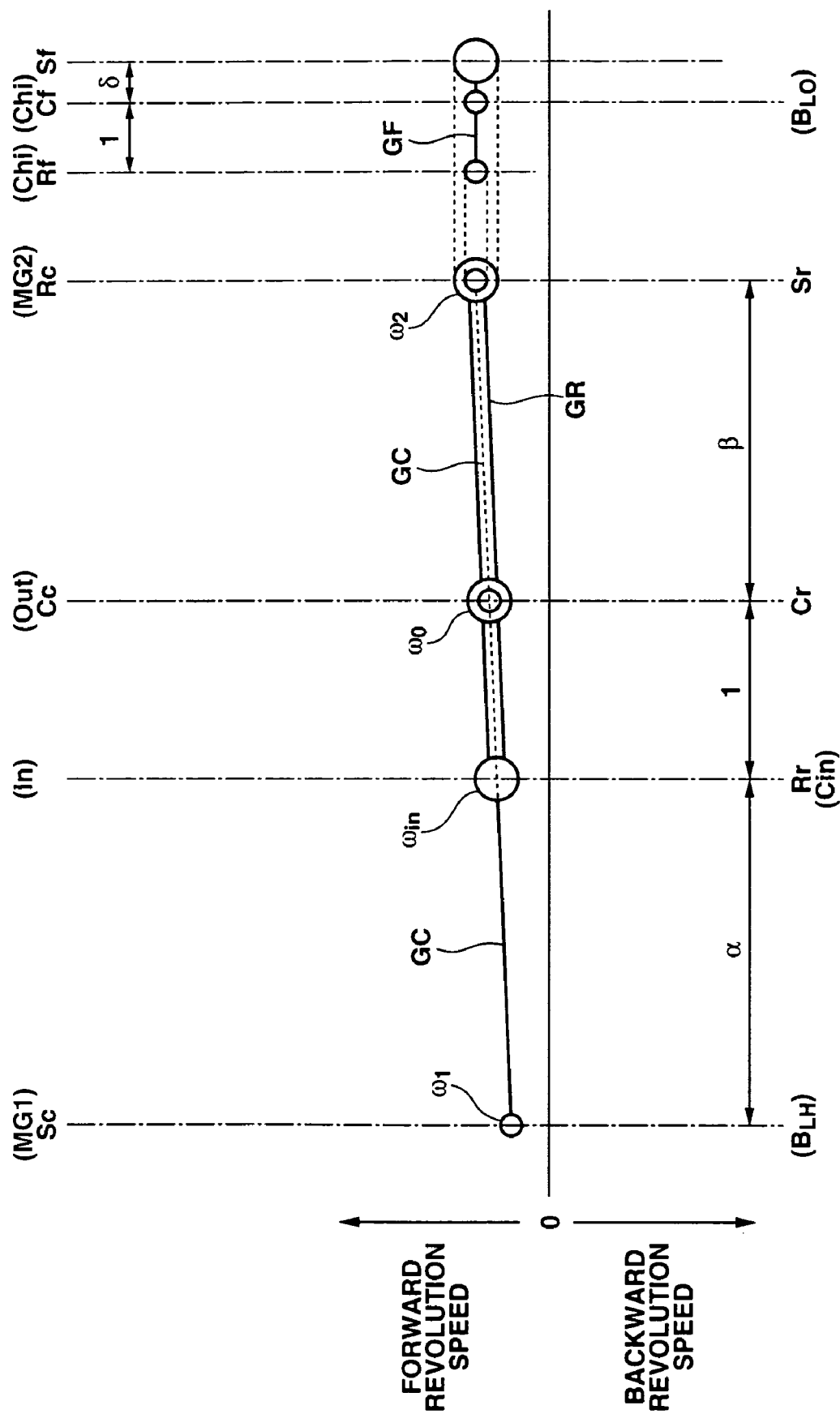

MODE SWITCH CONTROL APPARATUS AND METHOD FOR HYBRID TRANSMISSION

BACKGROUND OF THE INVENTION

1. Field of the Invention

The present invention relates to mode switch control apparatus and method for a hybrid transmission and, more specifically, relates to the mode switch control apparatus and method for the hybrid transmission which are capable of smoothly performing a mode switch (or mode transfer) from a low mode which is suitable for a continuously variable transmission (or called, an infinitely variable transmission) in a low shift (gear) ratio area to a high mode which is suitable for the continuously variable transmission in a high shift (gear) ratio area without an output torque variation and discontinuity of a change in the (gear) shift ratio.

2. Description of the Related Art

A Japanese Patent Application First Publication No. 2000-62483 published on Feb. 29, 2000 (which corresponds to a U.S. Pat. No. 5,931,757 issued on Aug. 3, 1999) exemplifies a previously proposed hybrid transmission. In the previously proposed hybrid transmission, a differential unit mutually links an engine, an output axle, and motor/generators and a clutch to mutually couple first predetermined revolutional elements constituting the differential unit and a brake fixing second predetermined revolutional elements are installed, these clutch and/or brake selective engagement operation selectively constitutes the low mode which is suitable for the continuously variable transmission in the low side shift ratio area and the high mode which is suitable for the continuously variable transmission in the high side shift ratio area. However, a mode switch technique between the low mode and the high mode has not specifically been proposed. Hence, when the mode switch in the previously proposed hybrid transmission is carried out, it is a common sense that, when it becomes a driving state to perform the mode switch, the corresponding clutch and/or brake is in an engagement state from a release state or, on the contrary, in the release state from the engagement state.

SUMMARY OF THE INVENTION

In the hybrid transmission in which the torque is changed involving a polarity reversal from the torque for one of motor/generators to be required in the low mode to the torque required in the high mode even if an engine torque and transmission output torque are substantially invariable during the mode switch from the low mode to the high mode, the engagement of a high mode selection clutch and/or brake is carried out without consideration a control of the motor/generator whose torque is changed along with the polarity reversal during the mode switch. At this time, an output torque variation and a discontinuity of a gear (shift) ratio change due to the torque change of the motor/generator along with the polarity reversal occur so that a smooth mode switch from the low mode to the high mode cannot be achieved. Consequently, a reduction in quality of the mode switch in the hybrid transmission is brought out.

It is, therefore, an object of the present invention to provide mode switch control apparatus and method for a hybrid transmission which are capable of carrying out a smooth mode switch from the low mode to the high mode of the hybrid transmission having the motor/generator whose torque is changed along with the polarity reversal even if the engine torque and transmission output torque are substantially invariable during the mode switch from the low mode to the high mode without occurrence of the output torque variation and the discontinuity of the variation of the shift ratio due to the torque change of the motor/generator along with the polarity reversal.

According to one aspect of the present invention, there is provided a mode switch control apparatus for a hybrid transmission, the hybrid transmission including: a differential unit by means of which an engine, an output axle, and at least one motor/generator are mutually linked; a clutch by means of which first predetermined revolutional elements of the differential unit are mutually coupled; and a brake by means of which second predetermined revolutional elements of the differential unit are fixed and the hybrid transmission being selectable between a low mode which is suitable for a continuously variable transmission in a low side gear area and a high mode which is suitable for the continuously variable transmission in a high side gear ratio area, an output torque of the motor/generator being changed along with a polarity reversal in the motor/generator from a torque required in the low mode to a torque required in the high mode during a mode switch from the low mode to the high mode in a state in which an engine output torque and a transmission output axle torque are substantially invariable, the mode switch control apparatus performing a mutual interlocking control for both of a rise in a transmission torque capacity of one of the clutch and brake which is switched from a release state to an engagement state during the mode switch from the low mode to the high mode to select the high mode and the torque change in the motor/generator along with the polarity reversal.

According to another aspect of the present invention, there is provided a hybrid transmission in which an engine, an output axle, and at least one motor/generator are mutually linked by means of a differential unit, first predetermined revolutional elements of the differential unit being mutually coupled to one another by means of a clutch or second predetermined revolutional elements being fixed by means of a brake, the hybrid transmission comprising: a controller to switch between an engagement and a release of the clutch or the brake in accordance with a travel state to select a predetermined travel mode, the controller controlling outputs of the engine and the motor/generator for an output axle torque of the hybrid transmission to be the same before and after a mode switch is carried out and the controller mutually interlocking a torque transmission capacity of one of the clutch and the brake which is engaged when the mode switch is carried out and a torque change of the motor/generator along with a polarity reversal in the motor/generator when the polarity reversal is involved in the motor/generator before and after the mode switch is carried out.

According to a still another aspect of the present invention, there is provided a control method applicable to a hybrid transmission wherein an engine, an output axle, and at least one motor/generator are mutually linked by means of a differential unit, first predetermined revolutional elements of the differential unit being mutually coupled to one another by means of a clutch or second predetermined revolutional elements being fixed by means of a brake, the control method comprising: switching between an engagement and a release of the clutch or the brake in accordance with a travel state to select a predetermined travel mode; controlling outputs of the engine and the motor/generator for an output axle torque of the hybrid transmission to be the same before and after a mode switch is carried out; and mutually interlocking a torque transmission capacity of one of the clutch and the brake which is engaged when the mode switch is carried out and a torque change of the motor/generator along with a polarity reversal in the motor/generator when the polarity reversal is involved in the motor/generator before and after the mode switch is carried out.

This summary of the invention does not necessarily describe all necessary features so that the invention may also be a sub-combination of these described features.

BRIEF DESCRIPTION OF THE DRAWINGS

FIGS. 7A and 7B are integrally a timing chart representing a mode switch control from the low mode to the high mode by the mode switch control apparatus in the embodiment shown in FIG. 1.

FIG. 15 is a lever diagram of the hybrid transmission shown in FIG. 11 in the high mode.

DETAILED DESCRIPTION OF THE PREFERRED EMBODIMENTS

Reference will hereinafter be made to the drawings in order to facilitate a better understanding of the present invention.

Figure 1:
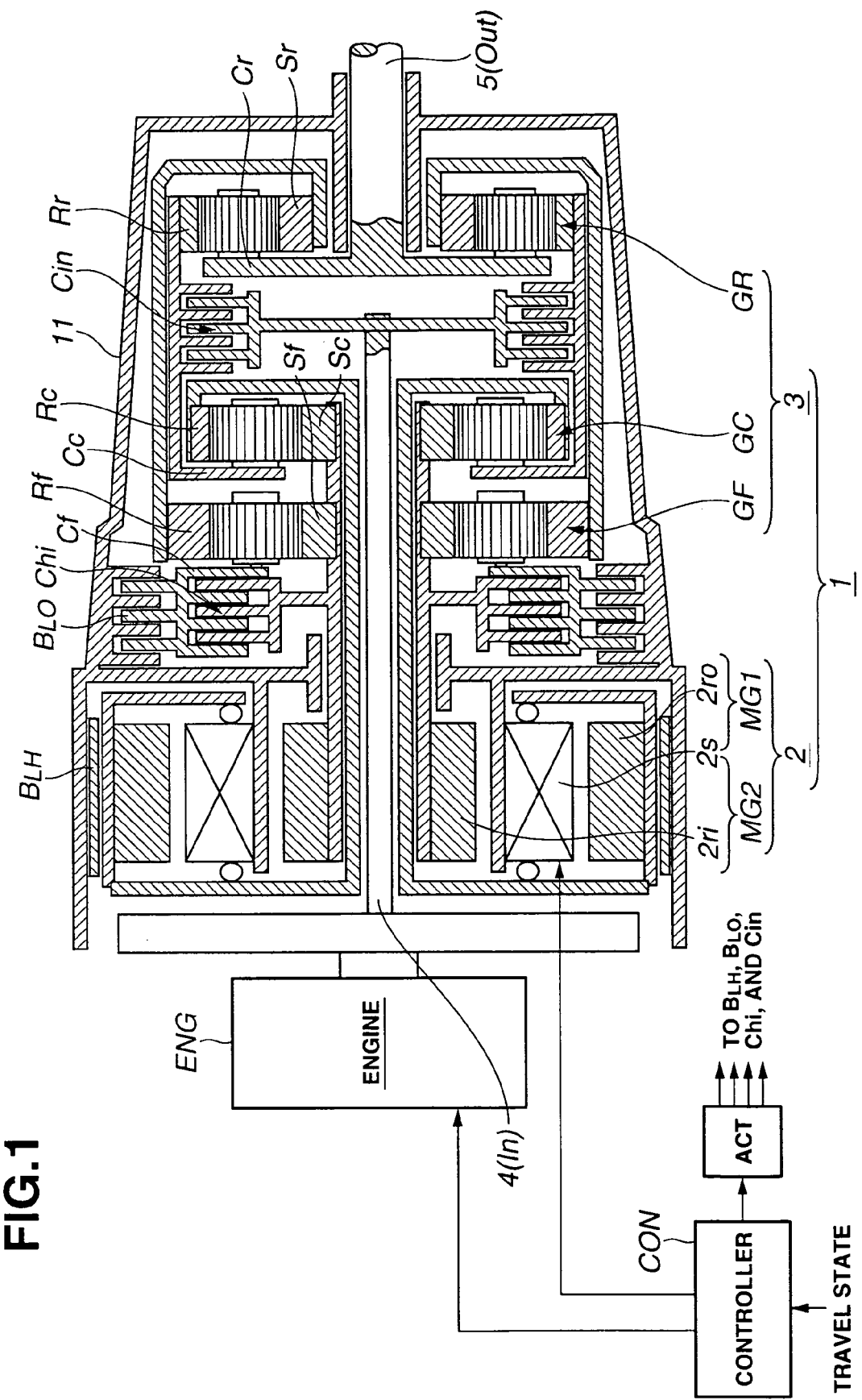
FIG. 1 is a partially diagrammatic longitudinally cross sectioned view of a hybrid transmission to which a mode switch control apparatus in a preferred embodiment according to the present invention is applicable.

FIG. 1 shows a hybrid transmission 1 to which a mode switch control apparatus in a preferred embodiment according to the present invention is applicable. In this embodiment, hybrid transmission 1 is used as a transmission of a rear (road) wheel drive vehicle (so-called, FR vehicle).

In FIG. 1, a reference numeral 11 denotes a transmission casing. Three simple planetary gear groups are coaxially arranged on the same axle toward right side (rear end far away from an engine ENG) of an axial direction of transmission casing 11. The three simple planetary gear groups are constituted by a front side planetary gear group GF nearest to engine ENG, a center planetary gear group GC, and a rear side planetary gear group GR which are coaxially incorporated into transmission casing 11. A motor/generator group which can be constituted by, for example, a compound (composite electrical) current two-layer motor 2 is coaxially arranged with the planetary gear groups described above at a position near to engine ENG. It is noted that front side planetary gear group GF, center planetary gear group GC, and rear side planetary gear group GR are correlated as follows to constitute a differential unit 3 having three degrees of freedom.

First, front side planetary gear group GF, center planetary gear group GC, and rear side planetary gear group FR are simple planetary gear groups, each having three elements of a sun gear Sf, Sc, Sr, a ring gear Rf, Rc, Rr, and a carrier Cf, Cc, Cr. Ring gear Rr is coupled to carrier Cc, this coupling being coupled to an input axle 4 (denoted by Input In shown in lever diagrams of FIGS. 2 through 5) through which a revolution of engine ENG is inputted via an engine clutch Cin. Carrier Cr is coupled to an output axle 5 (denoted by an Output Out shown in the lever diagrams of FIGS. 2 through 5). Compound current two-layer motor 2 is coaxially and rotatably supported within transmission casing and is constituted by an inner rotor $2ri$, annular outer rotor $2ro$ enclosing inner rotor $2ri$, and an annular stator $2s$ located at an annular space between inner rotor $2ri$ and outer rotor $2ro$ and fixed to transmission casing 11. Annular stator $2a$ and outer rotor $2ro$ constitute a first motor/generator MG1 which is an outer motor/generator and annular stator $2s$ and inner rotor $2ri$ constitutes a second motor/generator MG2 which is an inner motor/generator. It is noted that each of first and second motor/generators MG1, MG2 functions as a motor which outputs a revolution of individual direction and speed (including stop) in accordance with a supplied current when the compound current is supplied to motor side as a load and functions as a generator which develops an electrical power in accordance with a revolution thereof due to an external force when the compound current is supplied as the load of a generator side.

First motor/generator MG1 (outer rotor $2ro$) is coupled to ring gear Rc. Second motor/generator MG2 (inner rotor $2ri$) is coupled to sun gear Sf, this sun gear Sf being coupled to sun gear Sc. A high clutch Chi is connectable between carrier Cf and sun gear Sf. This carrier Cf is fixable by means of a low brake $B_{LO}$ and ring gear Rf is coupled to sun gear Sr.

In this embodiment, a band brake type low-and-high brake $B_{LH}$ is wound on an outer periphery of outer rotor $2ro$ so that ring gear Rc coupled to outer rotor $2ro$ is fixable. In addition, a revolution degree of freedom of differential unit 3 is, as described above, three. In details, as will be described later, since one or more of low brake $B_{LO}$, high clutch Chi, and low-and-high brake $B_{LH}$ are always operated to be engaged, the revolution degree of freedom of differential unit 3 is two or less. Hence, differential unit 3 is such that, if any two revolution speeds of the revoltional elements of differential unit 3 are determined, the revolution speeds of all revolutional elements are determined.

The lever diagrams of hybrid transmission 1 constructed as described above are shown in FIGS. 2 through 5. Center carrier Cc in the planetary gear group GC is mutually coupled to left ring gear Rr at planetary gear group GR, the revolution of engine ENG is inputted to these coupling body via engine clutch Cin. Right side sun gear Sr of planetary gear group GR and right side sun gear Sc in planetary gear group GC are respectively coupled to ring gear Rf in the planetary gear group GF and sun gear Sf of planetary gear group GF. In addition, low brake $B_{LO}$ to fix carrier Cf of planetary gear group GF is installed. High clutch Chi to couple mutually carrier Cf and sun gear Sf of planetary gear group GF is provided. Ring gear Rc of planetary gear group GC is coupled to first motor/generator MG1. Input In from engine ENG is coupled to the coupling body of carrier Cc of planetary gear group GC and ring gear Rr of planetary gear group GR. Output axle 5 (Output Out toward a road wheel drive system) is coupled to carrier Cr of planetary gear group GR. Second motor/generator MG2 is coupled to sun gear Sc (or sun gear Sf of planetary gear group GF) in planetary gear group GC. Furthermore, ring gear Rc of planetary gear group GC is fixable by means of low-and-high brake $B_{LH}$. It is noted that a lateral axis of each of FIGS. 2 through 5 denotes a distance ratio between the revolutional elements determined according to a gear ratio of planetary gear groups GF, GR. That is to say, a ratio of the distance between carrier Cc (ring gear Rr) and ring gear Rc is α and a ratio of the distance between carrier Cr and sun gear Sr (sun gear Sc) is β when a distance between ring gear Rr and carrier Cr is 1. In addition, the distance ratio between the revolutional elements determined by the gear ratio of planetary gear group GC, namely, a ratio of the distance between carrier Cf and ring gear Rf is δ when the distance between sun gear Sf and carrier Cf is 1.

Figure 6:
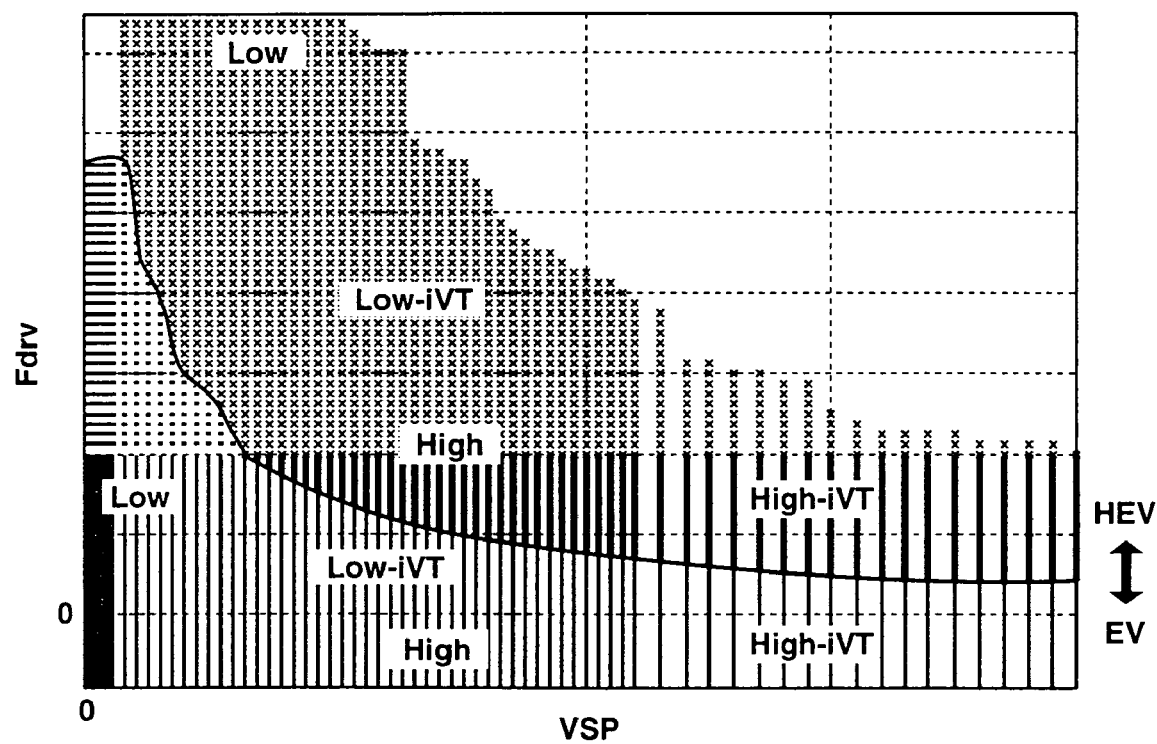
FIG. 6 is a travel mode map view preset in an integrated controller shown in FIG. 1.

It is noted that a travel mode switch control in each embodiment is carried out by means of an integrated controller CON shown in FIG. 1. In integrated controller CON, a traveling mode map in which various travel modes as shown in FIG. 6 are assigned into a three dimensional space by a demanded driving force Fdrv (determined according to an accelerator opening angle), a vehicle speed VSP, and S.O.C. (State Of Charge) of a vehicular battery. During the vehicle travel, traveling road map is searched according to each detected value of the demanded driving force Fdrv, vehicle speed VSP, and S.O.C. of the battery. An optimal travel mode is selected in accordance with a vehicle operating point determined according to demanded driving force Fdrv and vehicle speed VSP and battery charged quantity. It is noted that FIG. 6 is an example of the travel mode map represented in a two dimension of demanded driving force Fdrv and vehicle speed VSP by cutting the three-dimensional traveling mode map with a certain value in a capacity area in which the battery S.O.C. is sufficient. In FIG. 6, Low denotes the low mode in a fixed gear ratio, Low-iVT denotes the low mode which is suitable for a continuously variable transmission (an infinitely variable transmission). High denotes the high mode in the fixed gear ratio, High-iVT denotes the high mode in the continuously variable transmission, EV denotes an electric vehicle mode, and HEV denotes a hybrid electric vehicle mode. In addition, in FIG. 1, ACT denotes a hydraulic control actuator which supplies or drains a hydraulic to a low brake $B_{LO}$, low-and-high clutch $B_{LH}$, high clutch Chi, and engine clutch Cin so as to engage (fix) or release in accordance with a command (release or engage (fix)) from integrated controller CON.

Figure 2:
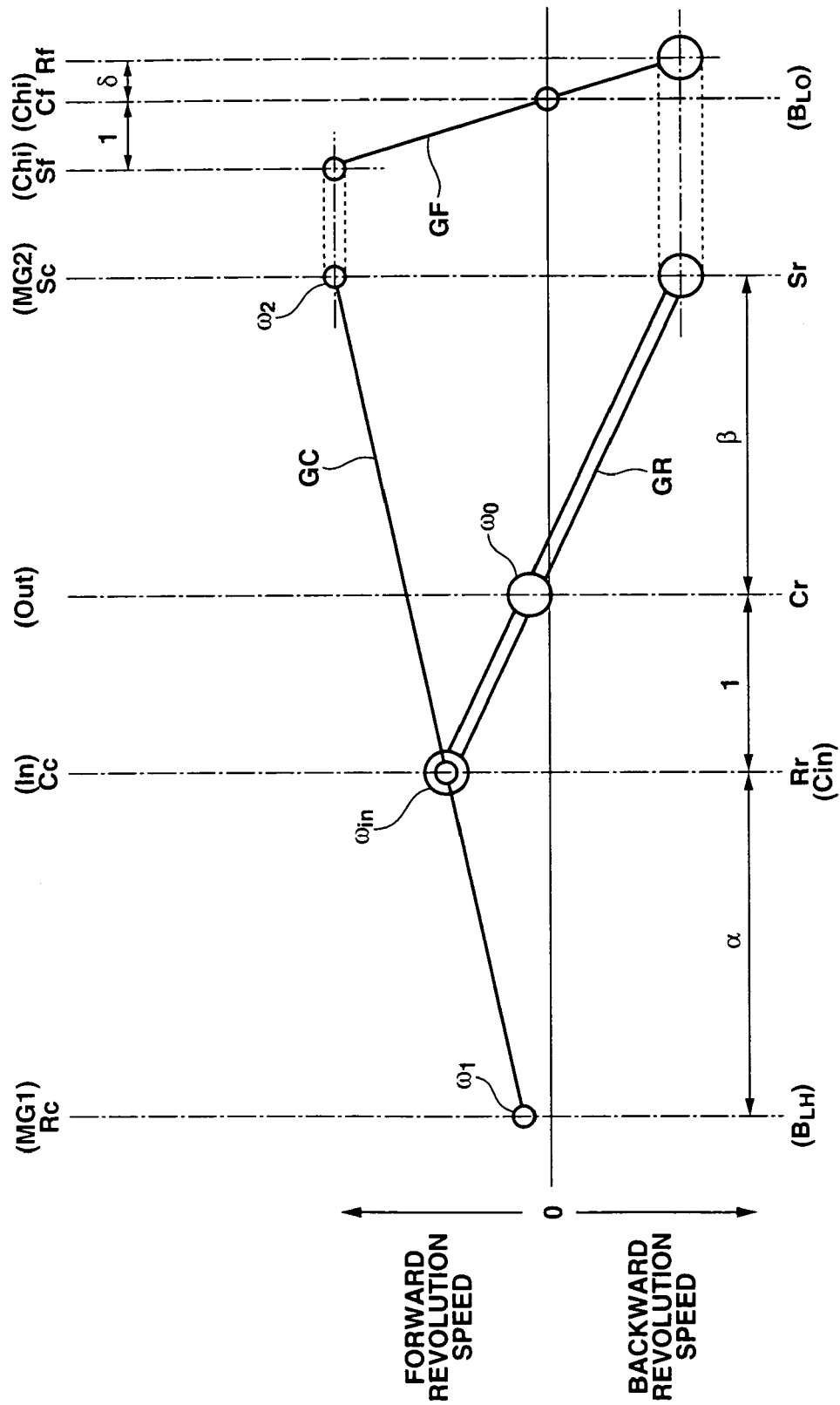
FIG. 2 is a lever diagram of the hybrid transmission shown in FIG. 1 in a low mode.

In the hybrid transmission represented by the lever diagrams of FIGS. 2 through 5, in a low mode in which the operation of low brake $B_{LO}$ causes carrier Cf to be fixed, a revolution speed of carrier Cf is zero as shown in FIG. 2. Hence, as shown in the lever (lever denoted in FIG. 2 by same sign of GF) related to planetary gear group GF, the revolution of sun gear Sr with respect to sun gears Sc, Sf is reversed determined by a teeth number ratio between ring gear Rf and sun gear Sf. Hence, a revolution speed ωo of output Out coupled to carrier Cr, as appreciated from FIG. 2, is lower than a revolution speed ωin (engine speed inputted via engine clutch Cin) of input In connected to carrier Cc (ring gear Rr). Thus, this low mode is used in a region of a low side shift (gear) ratio including a backward gear (shift) ratio than the gear ratio (shift ratio) at which the revolution speeds of sun gear Sc and sin gear Sf are zeroed.

If revolution speed ωin of input In is constant, second motor/generator MG2 causes a positive revolution of sun gear Sc to become high so that a reverse revolution of ring gear Rf is raised. Thus, the reverse revolution of sun gear Sr coupled to ring gear Rf is raised so that revolution speed ωo of output Out is reduced. Thus, the gear (shift) ratio can be transferred to the low side. Furthermore, the transfer is carried out from the low side infinite (vehicular stop) state to backward gear (shift) ratio can be made.

In the low mode in which low brake $B_{LO}$ is engaged, controls of motor/generators MG1, MG2 (revolution speeds thereof are denoted by $ω_1$ and $ω_2$) and the control of engine ENG freely select a revolution speed ratio between input revolution speed $ω_{in}$ and output revolution speed $ω_{out}$. At the same time, both of the shift ratio and driving force can be controlled and output can be determined. This low mode is the continuously variable transmissible gear ratio mode having two degrees of freedom.

In the low mode which is continuously variable transmissible, if the torque due to the acceleration/deceleration of the inertia is not considered, the following balance equations (1) are established if engine torque (transmission input torque) is Te, the transmission output torque is To, and the torques of first and second motor/generators MG1, MG2 are Ymg1 and Tmg2, the torque of low brake BLO is Tb, and the torque of high clutch Chi is Ti.

$$To+Te·(1+β)/β+Tmg1·(1+α+β)/β=0$$

$$To+Te+Tmg1+Tmg2+Tb=0$$

$$(∴Tmg2+Tb=-To-Te-Tmg1)$$

$$Tmg2=Tc+Tmg1·α/(1+β)+To·δ/(1+β) \quad (1).$$

In a case where low-and-high brake $B_{LH}$ is engaged in the low mode and ring gear Rc is fixed, low side gear (shift) ratio can be fixed. At the fixed low side gear (shift) ratio, a low-speed large torque traveling is possible by means of a large driving force which is the addition of the output of engine ENG and the output of second motor/generator MG2. It is noted that, in this case, if second motor/generator MG2 functions as a generator, the traveling according to the output reduced by the engine output is possible. In a case where low-and-high mode brake $B_{LH}$ is engaged in the low mode, with the revolution speed ratio between input revolution speed ωin and output revolution speed ωo fixed as described above, a power of second motor/generator MG2 added or subtracted to or from the power of engine ENG can be outputted. In this case, even in the low mode, a fixed gear (shift) ratio is resulted.

When, in the continuously variable transmissible low mode in which carrier Cf is fixed according to the operation of low brake $B_{LO}$, the operation of high clutch Chi couples between sun gear Sf and carrier Cf, the engagement advance of high clutch Chi causes the revolutions of sun gear Sc (sun gear Sf) and ring gear Rf (sun gear Sr) to be reduced. Hence, the lever diagram is directed from the state shown in FIG. 2 to the state shown in FIG. 4 via the state of FIG. 3. The revolution speeds of sun gear Sc (sun gear Sf) and ring gear Rf (sun gear Sr) are both zeroed and the state goes to that of FIG. 4. Consequently, the 2nd (second) mode is selected.

Figure 4:
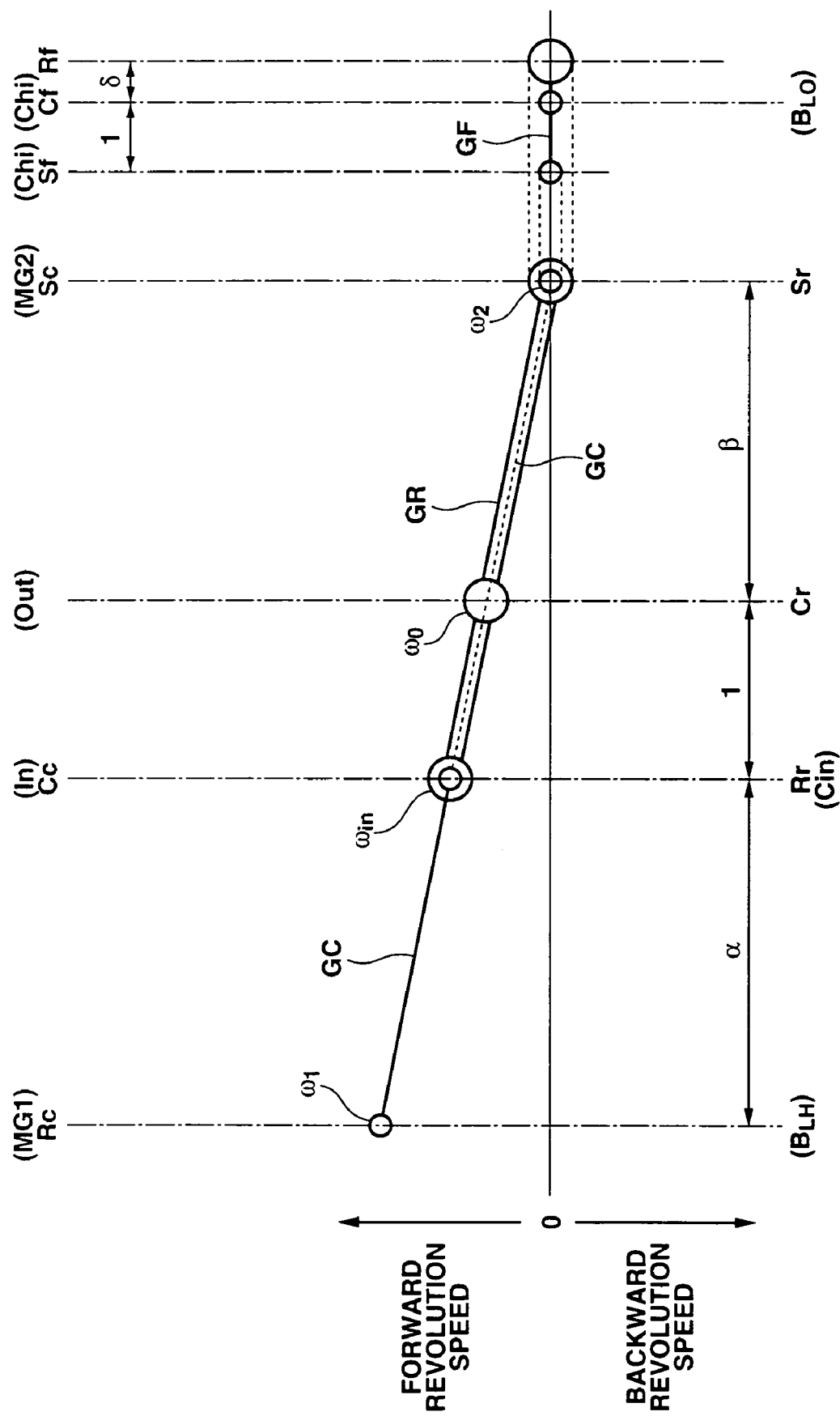
FIG. 4 is a lever diagram of the hybrid transmission shown in FIG. 1 in the second (2nd) mode.

In the second mode shown in FIG. 4, the revolution speeds of sun gears Sr, Sc are both zeroed. Thus, lever GR and lever GC are overlapped so that a straight line lever diagram having four elements and two degrees of freedom is resulted and sun gears Sr, Sc are fixed onto a position at which the revolution speed indicates zero. Therefore, the gear ratio can be fixed to 2nd gear ratio higher than the low mode. At the fixed second (2nd) mode gear ratio, the travel according to the output of engine ENG and/or output of first motor/generator MG1 is possible. Thus, the 2nd mode in which both low brake $B_{LO}$ and high clutch Chi are engaged is, as described above, the state in which the revolution speed ratio between input revolution ωin and output revolution ωo is fixed. The addition or subtraction of the power of first motor/generator MG1 to the engine power can be carried out and outputted. This second (2nd) mode is the fixed gear ratio mode.

The engagement of high clutch Chi causes the coupling between carrier Cf of planetary gear group GF and sun gear Sf thereof. At this time, if low brake $B_{LO}$ is released, all revoltional elements of Sr, Cf, and Rf are integrally revolved. As shown in lever diagram of FIG. 5, sun gears Sr, Sc maintain mutually coincident state and their revolutions are varied. In this case, the lever related to planetary gear group GR (denoted by the same sign of GR) is rested on the lever related to planetary gear group GC (denoted by the same sign of GC). The gear train constituted by planetary gear groups GC, GR is represented by the straight line lever diagram having four elements and two degrees of freedom.

In a high mode with the high clutch Chi engaged, controls of first and second motor/generators MG1, MG2 (the revolution speeds thereof are denoted by ω1 and ω2, respectively) and control of engine ENG freely select the revolution speed ratio between input revolution speed ωin and output revolution speed ωo and the output can be determined while controlling both of the gear (shift) ratio and the driving force. This high mode is the continuously variation transmission ratio mode. In this high mode, revolution speed ωo of output Out coupled to output Out coupled to carrier Cr is, as appreciated from FIG. 5, higher than the revolution speed ωin (engine speed inputted via engine clutch Cin) of input In coupled to carrier Cc (ring gear Rr). This high mode is used when the continuously variable transmission is demanded in an area of the high side gear (shift) ratio.

In a case where low-and-high mode brake $B_{LH}$ is engaged in the high mode and outer rotor 2ro is used to fix ring gear Rc, the high side gear (shift) ratio in the high mode can be fixed. At this fixed high side gear (shift) ratio, a high speed travel by only engine ENG is possible. An assistance of the driving force by means of second motor/generator MG2 and an energy regeneration can be carried out during a deceleration. The driving performance and improvement of fuel consumption can be compatible during the high speed travel. As described above, in the case where, at the high mode, low-and-high mode brake $B_{LH}$ is engaged, the revolution speed ratio between input revolution speed ωin and output revolution speed ωo is fixed. The power of second motor/generator MG2 is adjustably outputted with the engine power. In this case, the fixed gear (shift) ratio is resulted even in the high mode.

Figure 5:
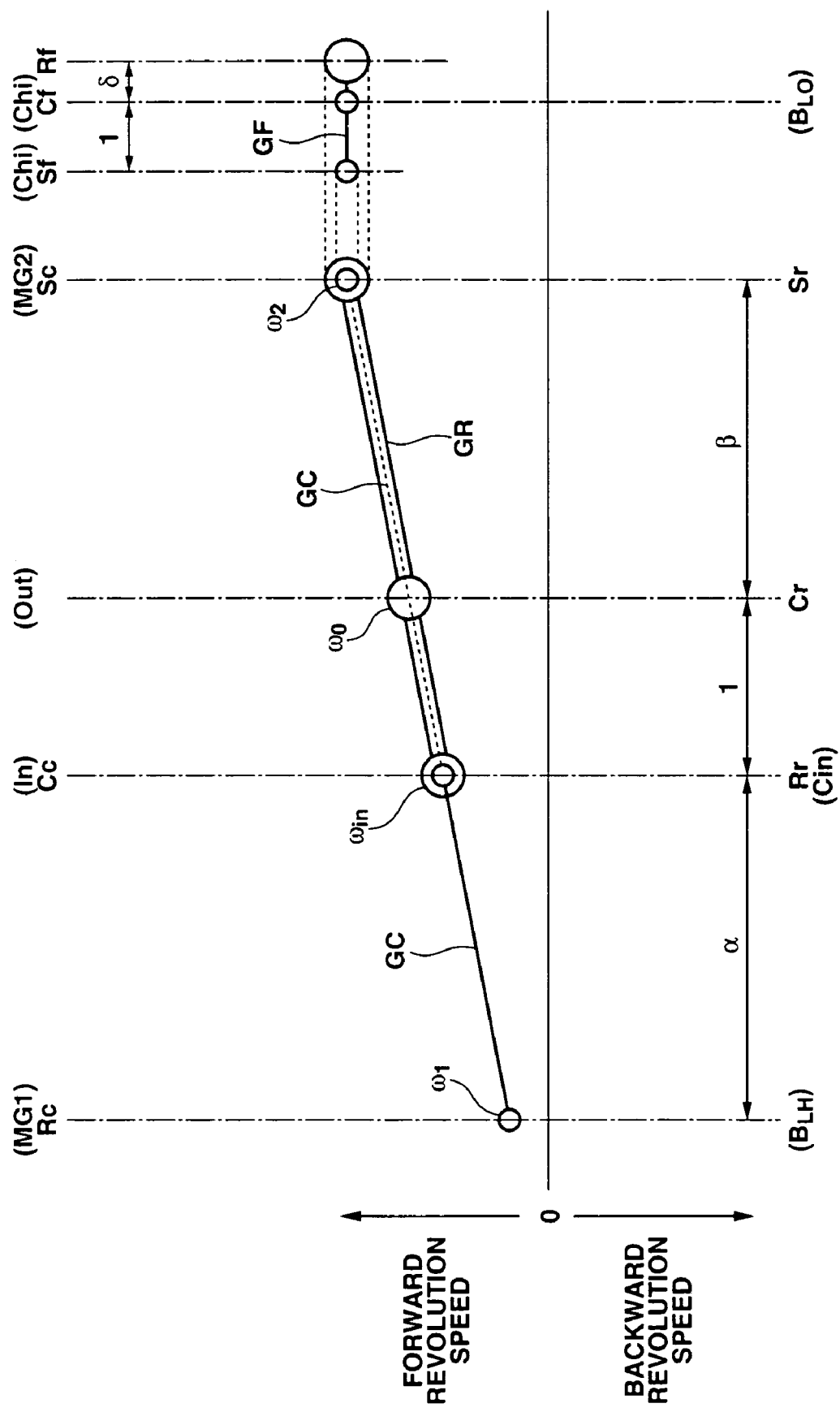
FIG. 5 is a lever diagram of the hybrid transmission shown in FIG. 1 in a high mode.

A mode switch from the low mode which is in (suitable for) the continuously variable transmission, the operation of low brake $B_{LO}$ causing carrier Cf being fixed, to the high mode which is (suitable for) in the continuously variable transmission, the operation of high clutch Chi coupling between sun gear Sf and carrier Cf, the mode switch being an object to be controlled according to the present invention, is as follows: In the low mode, first, high clutch Chi is engaged so that the lever diagram is transferred from the state of FIG. 2 to the state of FIG. 4 via state of FIG. 3. From the state of FIG. 4, low brake $B_{LO}$ is released so that the lever diagram is changed as shown in FIG. 5. At the same time, the torque control of second motor/generator MG2 to be carried out in association with the engagement advance of high clutch Chi and the release of low brake $B_{LO}$ and, then, the mode switch is carried out.

Figure 3:
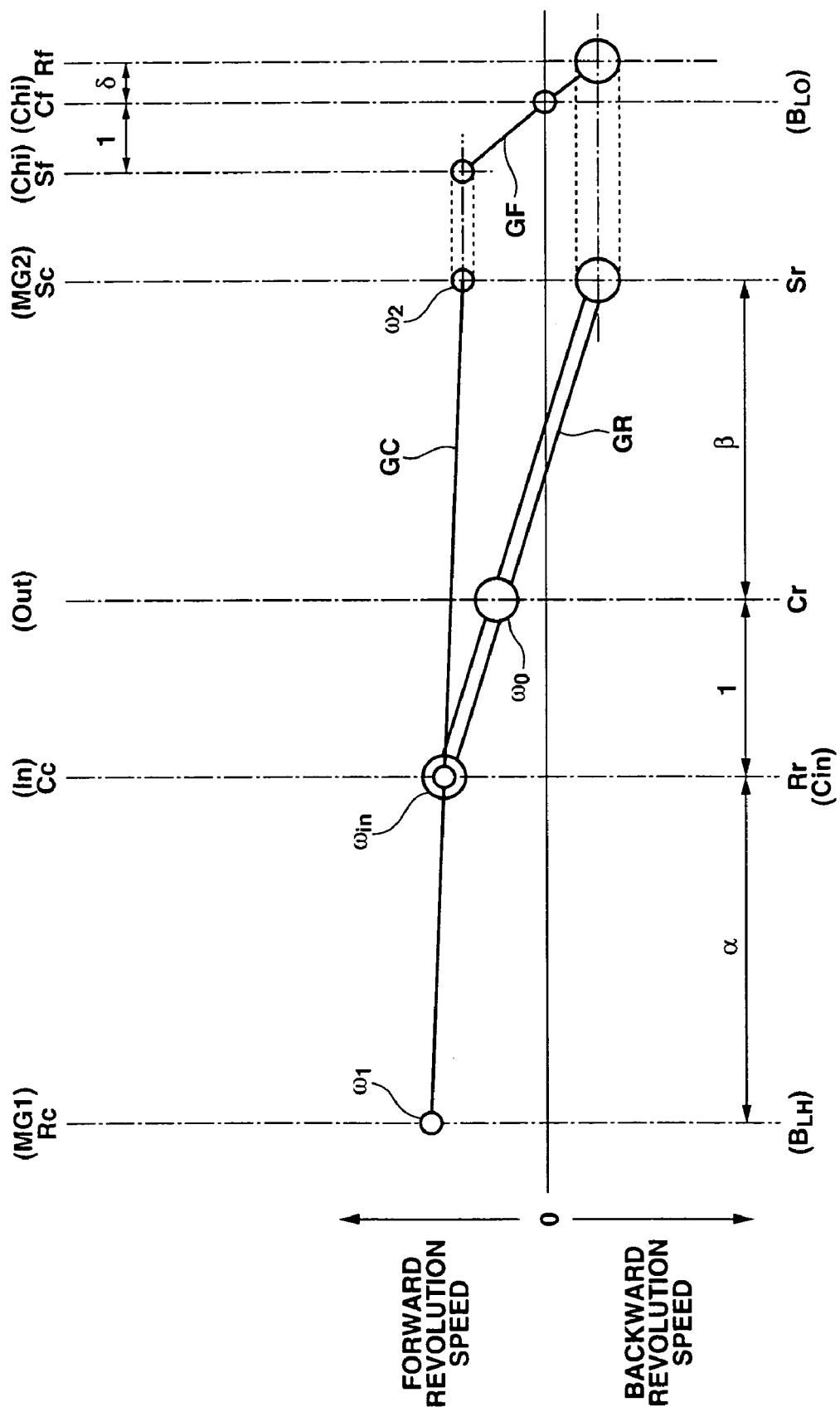
FIG. 3 is a lever diagram of the hybrid transmission shown in FIG. 1 when a mode is transferred (switched) from the low mode to a second (2nd) mode.

While the lever diagram is directed to the state shown in FIG. 4 via the state of FIG. 3, the torque of second motor/generator MG2 is a negative value in the direction at which the torque of second motor/generator MG2 reduces a forward revolution speed ω2 and its absolute value of the above-described torque is progressively reduced. On the other hand, while the lever diagram is directed from the state of FIG. 4 to the state of FIG. 5, the torque of second motor/generator MG2 is a positive value in the direction at which forward revolution speed ω2 is raised and its absolute value of the above-described torque is progressively increased. Consequently, second motor/generator MG2 generates the torque change along with a polarity reversal. The torque change of second motor/generator MG2 along with the polarity reversal develops the output torque variation and discontinuity of the change in the gear (shift) ratio so as to prevent a smooth mode switch from the low mode to the high mode and a reduction in quality of mode switching of the hybrid transmission is brought out.

To solve this problem, in this embodiment, the mode switch from the continuously variable transmissible low mode to the same continuously variable transmissible high mode is carried out along with timing charts shown in FIGS. 7A and 7B. Engine torque Te and torque Tmg1 of first motor/generator MG1 are controlled to be values to achieve a target driving force To and, during this control, the mode switch is carried out as described below. In this mode switch, the gear (shift) ratio when, with both of low brake $B_{LO}$ and high clutch Chi engaged, the lever diagram is shown in FIG. 4 is defined as a mode switch gear ratio i0. At an instantaneous time t1 at which an actual gear ratio (may be a target gear ratio) i becomes the low side gear ratio by a predetermined Δi1 with respect to mode switch gear ratio i0, a mode switch preparation is started.

This preparation is as follows: in order to render high clutch Chi to be switched from the release state to the engagement state toward an engagement start immediate before a state in which a loss stroke is finished, the control to supply a pre-charge pressure to this clutch Chi is started at instantaneous time t1. At an instantaneous time t2 at which the gear ratio i becomes the low side gear (shift) ratio by a predetermined Δi2 with respect to mode switch gear (shift) ratio i0, a shift (or exchange or replacement) of the engagement elements between high clutch Chi to be changed from the release state to the engagement state when the mode switch is carried out and low brake $B_{LO}$ to be changed from the engagement state to the release state is started, namely, a shift (or exchange or replacement) operation such that the engagement element is exchanged from the latter low brake $B_{LO}$ to high clutch Chi is started.

During the exchange (shift) operation of the engagement element, first, a torque capacity Tcc by which the pre-charged high clutch Chi is transmissible is raised from the instantaneous time t2 and this transmissible torque capacity Tcc is raised as the shift (gear) ratio i becomes closer to mode switch gear (shift) ratio i0. A value Tch of transmission torque capacity Tcc of high clutch Chi when gear ratio i becomes equal to the mode switch gear (shift) ratio i0 is a capacity derived by multiplying a high clutch torque Tc required after the mode is switched to the high mode under the present engine torque Te and torque Tmg1 of first motor/generator MG1 with a safety factor (for example, 1.2). Transmission torque capacity Tcc is commanded as a straight line varied from a command value 0 at the instantaneous time t2 to high clutch transmission torque capacity Tch required when (t4) the gear ratio i becomes mode switch gear ratio i0.

At an instantaneous time t3 at which the gear (shift) ratio i becomes low side gear (shift) ratio by a predetermined Δi3 with respect to mode switch shift (gear) ratio i0, torque Tmg2 of second motor/generator MG2 is started to be raised. The meaning of the raise in torque Tmg2 of second motor/generator MG2 is that, since torque Tmg2 of second motor/generator MG2 is negative value, the negative torque is, at first, reduced and the torque value is reversed at an instantaneous time t3', and the positive torque is raised (in a case where the transmission output torque is negative, the reverse occurs).

It is noted that the value of torque Tmg2 of second motor/generator MG2 is a value such that the gear (shift) ratio i is changed to the mode switch gear (shift) ratio i0 from the low side gear ratio lower by Δi3 than mode switch gear ratio i0 in accordance with the value of high clutch transmission capacity Tcc. Hence, torque Tmg2 value of second motor/generator MG2 is a torque value shown in FIG. 7A such that the gear (shift) ratio is advanced toward the high side for the torque value by which the gear (shift) ratio is balanced as represented by equation (1) (shown by a in FIG. 7A). For example, torque value Tmg2 is a value which is smaller by a predetermined value (for example, 0.1 the torque after the gear shift) than the torque at which the gear (shift) ratio is balanced or the balance torque when high clutch torque Tc is multiplied with a predetermined value which is smaller by 1 than high clutch torque (for example, 1/1.2 provided that 1.2 is a safety factor of Tcc).

It is noted that equation (1) is the balance equation in a case where high clutch Chi is arranged so as to couple between sun gear Sf and carrier Cf. The balance equation in a case where high clutch Chi is arranged so as to couple between carrier Cf and ring gear Rf is expressed as follows:

$$Tmg2 = Tc \cdot \delta + Tmg1 \cdot \alpha/(1+\beta) + To \cdot \delta/(1+\beta) \quad (2).$$

The balance equation in a case where a high clutch Chi is arranged so as to couple between sun gear Sf and ring gear Rf is expressed as follows:

$$Tmg2 = Tc \cdot (1+\delta) + Tmg1 \cdot \alpha/(1+\beta) + To \cdot \delta/(1+\beta) \quad (3).$$

The following mode switch end operation is carried out when it becomes an instantaneous time t4 of FIGS. 7A and 7B at which gear (shift) ratio i has reached to mode switch gear (shift) ratio. The high clutch transmission torque capacity Tcc is raised at a speed in proportion to an elapse time from instantaneous time t4, for example, at the speed which is twice the torque capacity for one second when the gear ratio i has reached to the mode switch gear (shift) ratio i0. Torque Tmg2 of second motor/generator MG2 is raised in proportion to the elapse time from instantaneous time t4 and is changed to the direction (positive direction) at which the gear shift toward the high side at a variation rate at which, for example, 0.5× absolute value of the torque required at the high mode+ predetermined value (0.1 torque Tmg2 during the development of a high mode maximum driving force generation at high mode) has achieved within one second.

Torque capacity Tbc at which low brake $B_{LO}$ is transmissible during the mode switch is determined according to the above equations in accordance with output torque To (driving force), engine torque Te, and torques Tmg1 and Tmg2 of first and second motor/generators MG1, MG2. Torque capacity Tbc is exemplified in FIG. 7A which is an addition of a value shown by b in FIG. 7A multiplied by a predetermined rate (for example, 1.2) to a predetermined value (for example, 0.05 low brake torque Tb at the time of a low mode maximum driving force at mode switch gear (shift) ratio i0). Since no slip of low brake $B_{LO}$ occurs at the gear (shift) ratio lower than mode switch gear (shift) ratio i0, low brake transmission torque capacity Tb is negligible if it is more than necessary. However, since it is desirable to reduce a low brake transmission torque Tb to substantially zero when the gear (shift) ratio is shifted toward the higher side than mode switch gear (shift) ratio i0, low brake transmission capacity Tb is changed interlocking with high clutch torque Tc and torque Tmg2 of second motor/generator MG2. to provide substantially this required capacity.

At an instantaneous time t5 at which gear (shift) ratio i becomes the ratio higher than mode switch gear (shift) ratio by predetermined Δi4, a maximum value is commanded to high clutch transmission torque capacity Tcc as shown in FIGS. 7A and 7B, zero (0) is commended to transmission torque capacity Tbc of low brake $B_{LO}$, a torque value required for the driving force control and gear ratio control in the high mode is commanded, and the mode switch from the low mode to the high mode is ended. Thus, all controls are switched to the controls required in the high mode.

Figure 10:
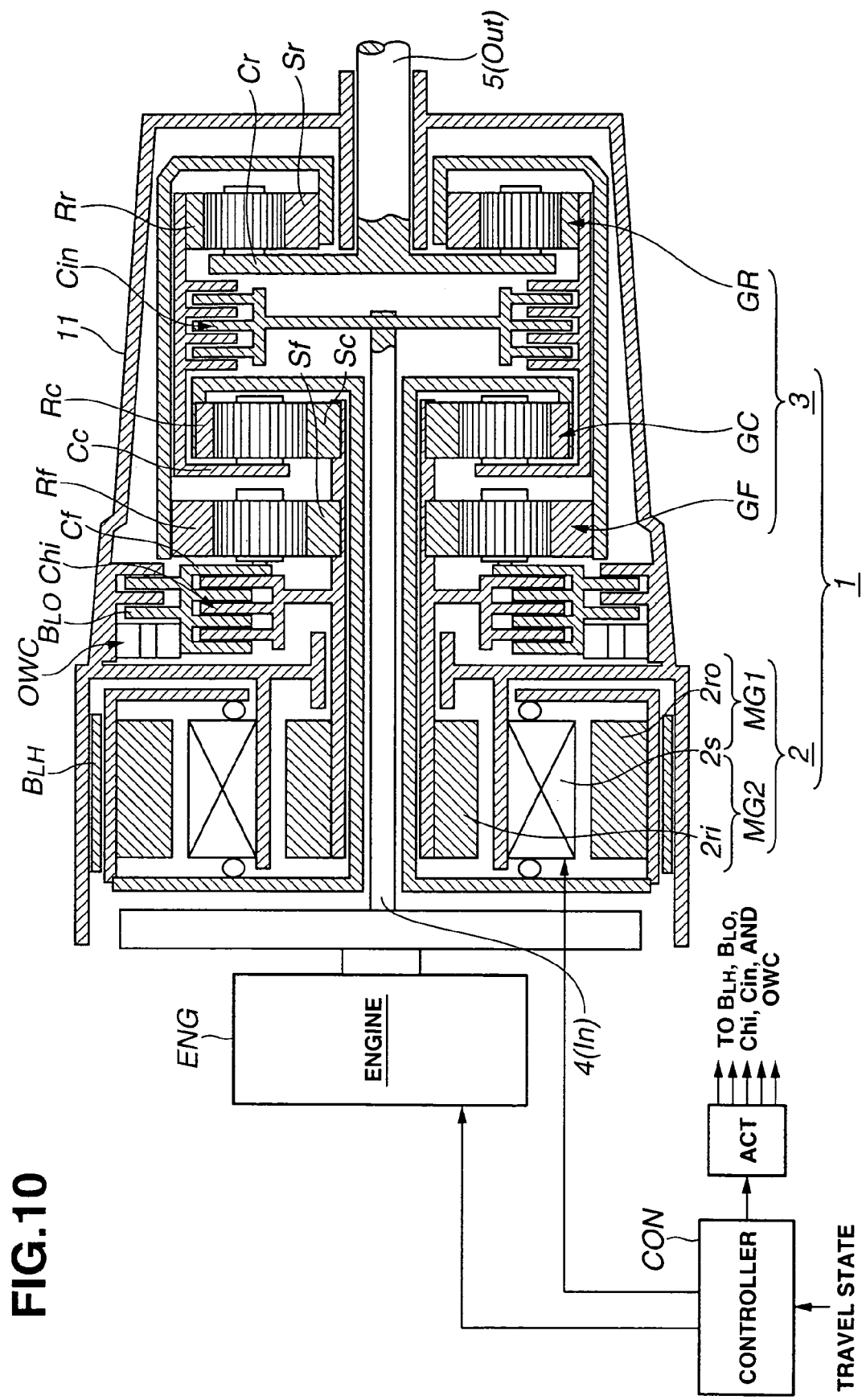
FIG. 10 is a partially diagrammatic longitudinally cross sectioned view of another example of the hybrid transmission to which the mode switch control apparatus according to the present invention is applicable.

In hybrid transmission 1 shown in FIG. 1, a one-way clutch OWC is disposed in parallel to low brake $B_{LO}$ as shown in FIG. 10. This one-way clutch OWC can serve as a low mode selection function in place of low brake $B_{LO}$. In the hybrid transmission shown in FIG. 10, it is not necessary to reduce transmission torque capacity Tbc of low brake $B_{LO}$ under a strict control as described above. After high clutch Chi is engaged, torque transmission capacity Tbc is zeroed as denoted by c in FIG. 7A before gear (shift) ratio i has reached to mode switch gear ratio i0. However, a total torque of low brake torque Tb and one-way clutch torque can assuredly and sufficiently develop the required torque. A simple control permits the generation of the above action.

At any rate, according to the mode switch control in the embodiment, both of the rise in transmission torque capacity Tcc of high clutch Chi for high mode selection and the change in torque Tmg2 along with the polarity reversal of second motor/generator MG2 during the mode switch from the continuously variable transmissible low mode to the continuously variable transmissible high mode are mutually interlocked and controlled. Hence, the smooth mode switch from the low mode to the high mode can be compensated. The mode switch quality is increased and the above-described problem to be solved by the present invention can be eliminated.

It is noted that, in the above-described embodiment, when a mutual interlocking control between the rise in high clutch transmission capacity Tcc and the change in torque Tmg2 along with the polarity reversal of second motor/generator MG2 is carried out, these are in an open control in a feedforward mode so that the control is simplified. It is of course that one of these is in the open control and the other is feedback control so that it is preferable that a smoother and continuous change in the transmission gear (shift) ratio can be compensated.

First, another preferred embodiment of the mode switch control apparatus in which the rise control of high clutch transmission torque capacity Tcc is in the open control and the control of torque Tmg2 of second/motor generator MG2 is the feedback control will be described below with reference to FIGS. 8A and 8B. Hereinafter, hybrid transmission is shown in FIG. 1 and the mode switch control will be described. Engine torque Te and torque Tmg1 of first motor/generator MG1 are controlled to a value at which target driving force To is achieved. During this control, the mode switch is carried out in the following way along with a timing chart shown in FIGS. 8A and 8B.

At instantaneous time t1 at which gear (shift) ratio i becomes lower side gear (shift) ratio than mode switch gear (shift) ratio i0 by a predetermined Δi1, the mode switch preparation is started. High clutch Chi becomes the engagement start immediate before state at which the loss stroke is completed by means of the pre-charge pressure. At instantaneous time t2 at which gear (shift) ratio i becomes the gear ratio lower than mode switch gear ratio i0 by a predetermined Δi2, the shift (or replacement) operation of the engagement element by means of the release of low brake $B_{LO}$ and the engagement of high clutch Chi is started. When the replacement operation of the engagement element is carried out, transmissible torque capacity Tcc of pre-charged high clutch Chi is raised at instantaneous time t2 and this transmission torque capacity Tcc is raised as gear ratio i comes closer to mode switch gear (shift) ratio i0.

A value Tch of transmission torque capacity Tcc of high clutch Chi when gear ratio i becomes mode switch gear ratio i0 is high clutch torque Tc required after the mode is switched to the high mode under the present engine torque Te and torque Tmg1 of first motor/generator MG1. Transmission torque capacity Tcc is commanded in accordance with the change in gear (shift) ratio i and as a value which is linearly changed to high clutch transmission torque capacity Tch required at instantaneous time (t4) at which the gear ratio i becomes mode switch gear (shift) ratio i0 from command value of 0 at instantaneous time t2.

Figures 8A, 8B:
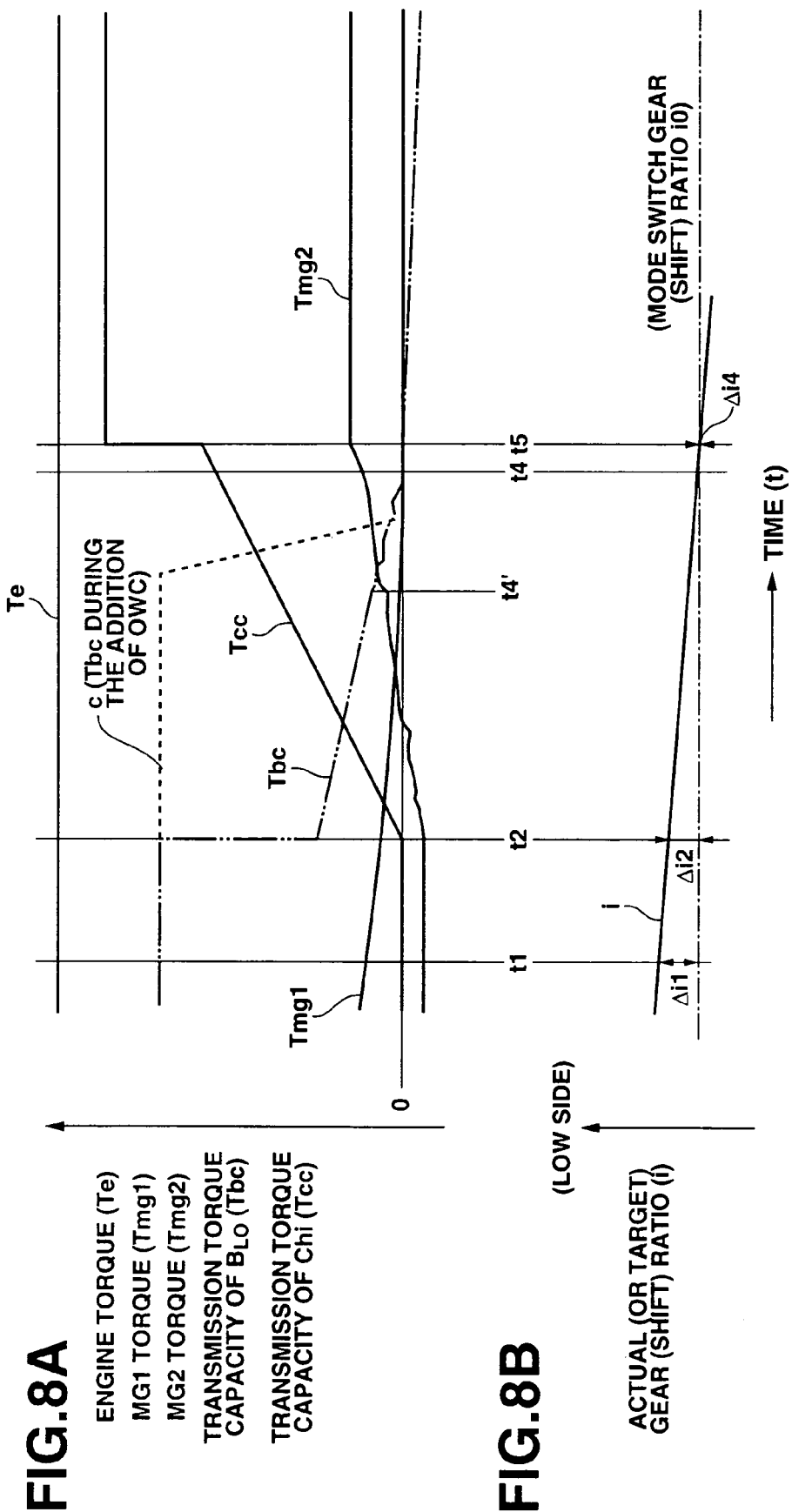
FIGS. 8A and 8B are integrally a timing chart representing the mode switch control by the mode switch control apparatus in another preferred embodiment according to the present invention.

On the other hand, torque Tmg2 of second motor/generator MG2 is feedback controlled in such a way that actual gear ratio i is made coincident with target gear ratio i* and commanded as shown in FIGS. 8A and 8B. The feedback control of torque Tmg2 of motor/generator takes the following methods. One of the above methods is such that actual gear (shift) ratio i (=ωin/ωo) is calculated from transmission input revolution speed ωin (refer to FIGS. 2 through 5) and transmission output revolution speed ωo (refer to FIGS. 2 through 5), a correction value of torque Tmg2 of second motor/generator MG2 required to make actual gear (shift) ratio i coincident with target gear (shift) ratio i* is derived according to a PID control (Proportional control, Integration control, and Differential control) in accordance with an error between actual gear (shift) ratio i and target gear (shift) ratio i*, and this correction value is added to a theoretical value of torque Tmg2 of second motor/generator MG2 which can be determined from equation (1) so as to provide and output the command value of torque Tmg2 of second motor/generator MG2.

The following mode switch end operation is carried out at instantaneous time t4 at which actual gear ratio i has reached to mode switch gear ratio i0. One operation is the operation to completely engage high clutch Chi. High clutch transmission torque capacity Tcc is raised at the speed which is in proportion to an elapse time from instantaneous time t4, for example, twice the torque capacity when actual gear ratio i has reached to mode switch gear (shift) ratio i0 within one second. On the other hand, torque Tmg2 of second motor/generator MG2 is feedback controlled (PID) so that actual gear shift ratio i is made coincident with target gear (shift) ratio i*.

Transmissible torque capacity Tbc of low brake $B_{LO}$ during the mode switch is a value determined according to the above equations in accordance with output torque To (driving force), engine torque Te, torques Tmg1 and Tmg2 of first and second motor/generators MG1 and MG2 multiplied with a predetermined rate (for example, 1.2) and added by the predetermined value (for example, 0.05 low brake torque Tb during the low mode maximum driving force generation at mode switch gear (shift) ratio i0) as shown in FIG. 8A.

For example, at an instantaneous time t4' at which transmissible torque capacity Tbc of low brake $B_{LO}$ is insufficient and the gear (shift) ratio is lower than mode switch gear (shift) ratio, in a case where low brake $B_{LO}$ slips, transmission torque capacity Tbc of low brake $B_{LO}$ is feedback controlled so that a slip quantity of low brake $B_{LO}$ is equal to or smaller than a predetermined value (for example, 50 rpm). When this feedback control is carried out, for example, a difference value of a subtraction of the predetermined value (50 rpm) from the slip quantity of low brake $B_{LO}$ (absolute value) is negative. At this time, the error is assumed to be zero. If the difference value is positive, this difference value is directly the error and a value derived by adding the correction quantity according to the PID control in accordance with this error to the above open control value is a command value of low brake transmission torque capacity Tbc.

At an instantaneous time t5 at which gear (shift) ratio i is at a higher gear ratio than mode switch gear (shift) ratio i0 by a predetermined Δi4, as shown in FIGS. 8A and 8B, a maximum value is commanded to high clutch transmission torque capacity Tcc. Zero (0) is commanded to transmission torque capacity Tbc of low brake $B_{LO}$. A torque value required in the driving force control and gear (shift) ratio control in the high mode is commanded. The mode switch (transfer) from the low mode to the high mode is ended and all controls are switched to the controls required for the high mode.

The above-described embodiment can be applied to the hybrid transmission in which one-way clutch is disposed in parallel to low brake $B_{LO}$ as shown in FIG. 10. However, in this case, it is not necessary to reduce transmission torque capacity Tbc of low brake $B_{LO}$ under a strict control. Even if transmission torque capacity Tbc is zeroed as shown by c in FIG. 8A before actual gear ratio i has reached to mode switch gear ratio i0 after high clutch is engaged, a total torque of low brake torque Tb and the one-way clutch torque can assuredly and sufficiently generate the required torque. The simple control can generate the above action.

According to the mode switch control in this embodiment, since the mutual interlocking control between the rise of transmission torque capacity Tcc of high clutch Chi for high mode selection and the change in torque Tmg2 along with the polarity reversal of second motor/generator MG2 is carried out, an output torque variation due to the change in torque Tmg2 of second motor/generator MG2 along with the polarity reversal and the discontinuity of the variation in the gear (shift) ratio variation are eliminated. At the same time, the smooth mode switch from the low mode to the high mode can be compensated. The mode switch quality is increased and the above-described problem can be eliminated. According to the mode switch control, in this embodiment, when the interlock control between the rise in high clutch transmission capacity Tcc and the change in torque Tmg2 of motor/generator MG2 is carried out, the rise control of high clutch transmission torque capacity Tcc is in the open control and the control of torque Tmg2 of second motor/generator MG2 is the feedback control for making actual gear ratio i follow target gear ratio i*. Hence, while achieving the gear ratio change aimed at target gear (shift) ratio i*, the mode switch can be carried out. The above-described action and advantage such as the elimination of the discontinuity of the change in the gear (shift) ratio can be more remarkably exhibited.

Next, a still another preferred embodiment of the mode switch control apparatus in which the control over toque Tmg2 of second motor/generator MG2 is in the open control and the control of the rise in high clutch transmission torque capacity Tcc is in the feedback control will be described with reference to FIGS. 9A and 9B. Hereinafter, the mode switch control is explained in a case where the hybrid transmission is as shown in FIG. 1. Engine torque Te and torque Tmg1 of first motor/generator MG1 are controlled to a value at which the target driving force To is achieved and the mode switch is carried out in the following way along the timing chart shown in FIGS. 9A and 9B.

At instantaneous time t1 at which gear (shift) ratio i is lower than mode switch gear ratio i0 by predetermined Δi1, the mode switch preparation is started. At this time, high clutch Chi becomes the engagement start immediate before state at which the loss stroke is completed by the pre-charge pressure. At instantaneous time t2 at which actual gear (shift) ratio is lower than mode switch gear ratio i0 by predetermined Δi2, the replacement (shift) operation such that the release of low brake $B_{LO}$ and engagement of high clutch Chi are started.

Figures 9A, 9B:
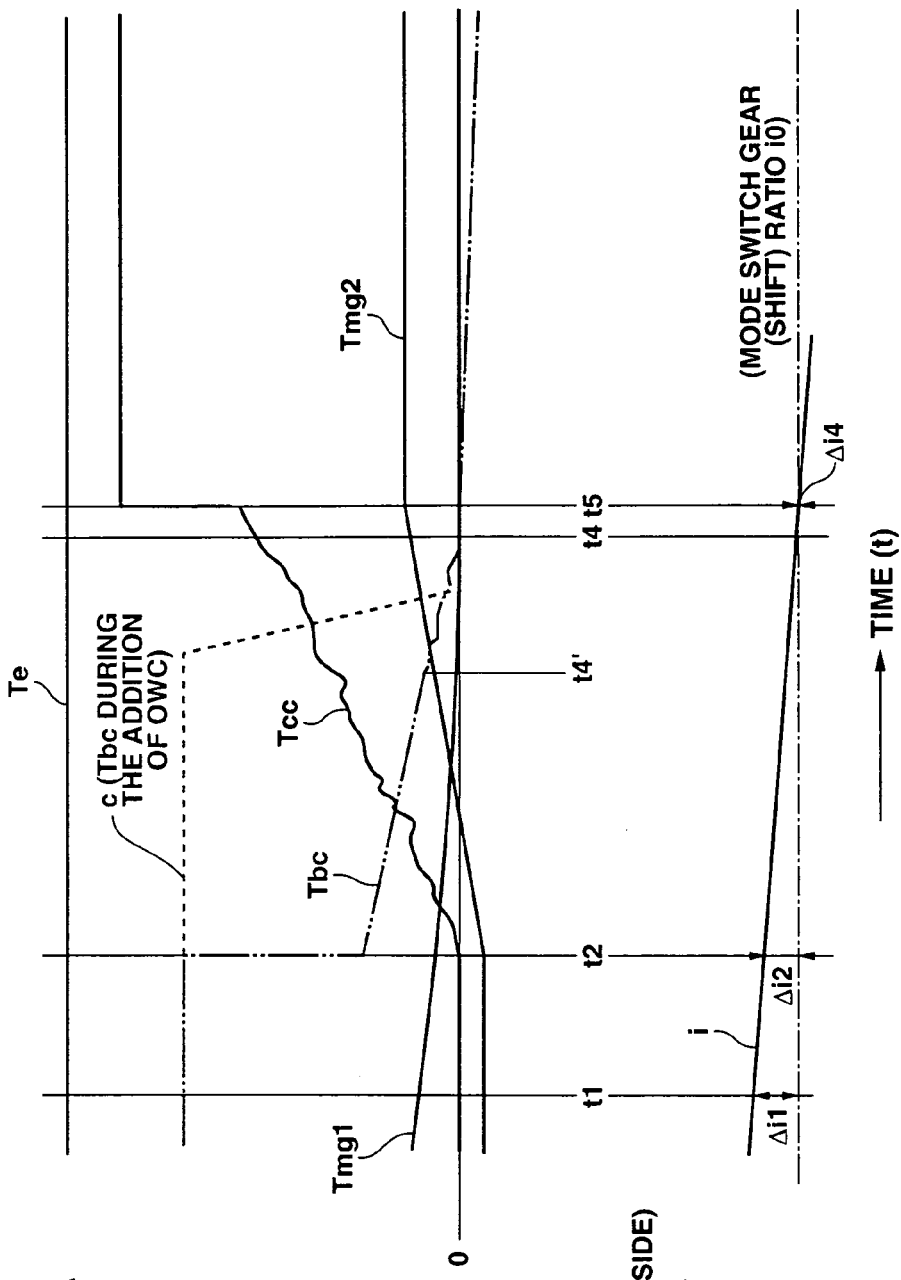
FIGS. 9A and 9B are integrally a timing chart representing the mode switch control by the mode switch control apparatus in a still another preferred embodiment according to the present invention.

When the replacement operation is carried out, first, torque Tmg2 of second motor/generator MG2 is raised after instantaneous time t2 in FIG. 9A from the torque value in the low mode to the torque value required after the mode is switched to the high mode as the gear ratio i becomes closer to mode switch gear ratio i0. Torque Tmg2 of second motor/generator MG2 after instantaneous time t2 is set to be varied linearly in accordance with actual gear (shift) ratio i from required torque at the low mode at instantaneous time t2 to the required torque after the mode switch to the high mode.

On the other hand, high clutch torque capacity Tcc is feedback controlled in such a way that actual gear ratio i is made coincident with the target gear (shift) ratio and is commanded as shown in FIG. 9A. The feedback control of high clutch transmission torque capacity Tcc takes the following way. On method is such that the actual gear (shift) ratio i (−ωin/ωo) is calculated from transmission input revolution speed ωin (refer to FIGS. 2 through 5) and transmission output revolution speed ωo (refer to FIGS. 2 through 5), the correction quantity for high clutch transmission torque capacity Tcc required to make actual gear ratio i coincident with target gear shift ratio i* by means of the PID control in accordance with the error between actual gear ratio i and target gear ratio i* is derived, this is added to the theoretical value of high clutch transmission torque capacity Tcc which can be derived from equation (1) to provide and output the command value of high clutch transmission torque capacity Tcc.

At instantaneous time t4 at which actual gear ratio i has reached to mode switch gear ratio i0, the following mode switch end operation is carried out. One is that high clutch Chi is completely clutched. At this time, high clutch torque capacity Tcc is raised at a speed in proportion to an elapsed time from instantaneous time t4, for example, which is twice the torque capacity at the time of reaching to mode switch transmission ratio i0 within one second. On the other hand, torque Tmg2 of second motor/generator is a torque varied in proportion to the elapsed time from instantaneous time t4, for example, the torque varied in the direction (positive direction at which the higher side gear ratio occurs at a speed such that a sum of a value of 0.5 absolute value of the torque required in the high mode with a predetermined value (a torque value 0.1 torque Tmg2 when the maximum driving force which is predicted at the high mode under the mode switch gear ratio) is achieved within one second.

Transmissible torque capacity Tbc of low brake $B_{LO}$ during the mode switch is a value determined according to the above equation in accordance with output torque To (driving force), engine torque Te, torques Tmg1, Tmg2 of first and second motor/generators MG1, MG2 multiplied with the predetermined rate (for example, 1.2) which is added to the predetermined value (for example, 0.05 low brake torque Tb at the time of low mode maximum driving force development at the mode switch gear ratio i0) (refer to FIG. 9A).

In a case where, at, for example, an instantaneous time t4' at which transmissible torque capacity Tbc of low brake $B_{LO}$ is insufficient and actual gear (shift) ratio i is lower than mode switch gear (shift) ratio i0, low brake $B_{LO}$ slips, transmission torque capacity Tbc of low brake torque $B_{LO}$ is feedback controlled so that the slip quantity of low brake $B_{LO}$ is equal to or smaller than the predetermined value (for example, 50 rpm). In the feedback control, when the difference value of subtraction of the predetermined value (50 rpm) from the slip quantity (absolute value) of low brake $B_{LO}$ is negative, the error is zeroed. If the difference values is positive, the value thereof is directly the error. A value derived by adding the correction quantity by means of PID control in accordance with the error to the open control value is a command value of low brake transmission torque capacity Tbc.

At instantaneous time t5 at which gear ratio i is higher than mode switch gear (shift) ratio i0 by a predetermined Δi4, the maximum value is commanded to high clutch transmission torque capacity Tcc as shown in FIG. 9A, zero is commanded to transmission torque capacity Tbc of low brake $B_{LO}$, and a torque value required for the driving force control and the gear (shift) ratio control in the high mode is commanded. Thus, the mode switch from the low mode to high mode is ended and all controls are switched to the control required in the high mode.

The above-described other example can be applied to the hybrid transmission in which a one-way clutch (OWC) is installed in parallel to low brake $B_{LO}$ as shown in FIG. 10. However, it is not necessary to reduce transmission torque capacity Tbc of low brake $B_{LO}$ under a strict control. Even if transmission torque capacity Tbc of low brake $B_{LO}$ is zeroed as denoted by c in FIG. 9A before actual gear (shift) ratio i has reached to mode switch gear ratio i0 after high clutch Chi is engaged, the total torque of low brake torque Tb and one-way clutch (OWC) can assuredly and sufficiently develop the require torque. The simple control can generate the above action and advantages.

According to the mode switch control in the other example described above, the mutual interlocking control between the rise of transmission torque capacity Tcc of high clutch Chi for high mode selection and the change in torque Tmg2 along with the polarity reversal of motor/generator MG2 is carried out. Hence, the output torque variation and the discontinuity of the change in the gear (shift) ratio due to the torque (Tmg2) change of second motor/generator MG2 along with the polarity reversal are eliminated. At the same time, the smooth mode switch from the low mode to the high mode can be compensated. The mode switch quality is increased the above-described problem to be solved can be eliminated.

According to the mode switch control in this embodiment, when the interlocking control between the rise in high clutch transmission torque capacity Tcc and the change in the motor/generator torque Tmg2 is carried out, the control for torque Tmg2 of second motor/generator MG2 is in the open control and the rise control of high clutch transmission torque capacity Tcc is in the feedback control for making actual gear (shift) ratio follow target gear (shift) ratio i*. Hence, while the gear (shift) ratio change aimed at target gear (shift) ratio i* is achieved, the mode switch can be carried out so that the above action and advantage of eliminating the discontinuity of the gear ratio change can be more remarkable.

It is noted that, although it is common to all embodiments described above for the hybrid transmission shown in FIG. 1, transmissible torque capacity Tbc of low brake $B_{LO}$ engaged during the low mode selection is reduced in substantial synchronization with the mutual interlocking control between the rise of high clutch transmission capacity Tcc and the change in torque Tmg2 of second motor/generator MG2. Hence, even if one-way clutch (OWC) is not used in the hybrid transmission, as shown in FIG. 10, the reduction in low brake transmission torque capacity Tbc for the above-described interlocking control is always appropriately carried out. Thus, an interlock tendency of the hybrid transmission during the mode switch can assuredly be avoided.

Figure 11:
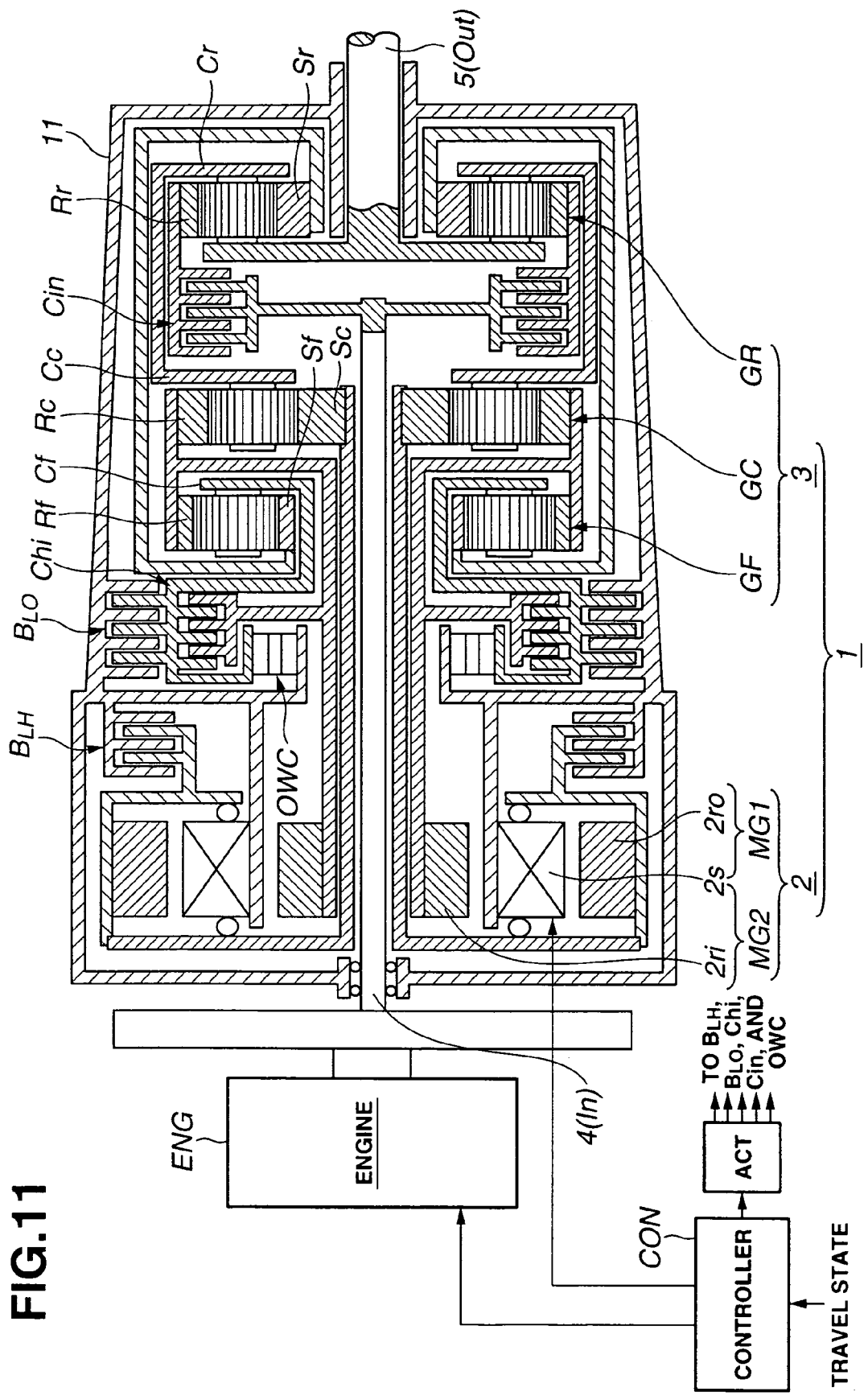
FIG. 11 a partially diagrammatic longitudinally cross sectioned view of a still another example of the hybrid transmission to which the mode switch control apparatus according to the present invention is applicable

In the above-described embodiment, the mode switch control apparatus has been explained in the case where the mode switch control apparatus is shown in FIG. 1 or FIG. 10. The hybrid transmission is not limited to these. The mode switch control apparatus according to the present invention is applicable to the hybrid transmission as shown in FIG. 11.

The detailed explanation of hybrid transmission 1 shown in FIG. 11 will hereinafter be made. This hybrid transmission 1 is usable for the transmission for FR (Front engine rear wheel) car (rear wheel driven vehicle). In FIG. 11, the same parts as shown in FIGS. 1 and 10 are designated by the same reference numerals and the overlapped explanations are avoided.

That is to say, within transmission casing 11, in the same way as described with reference to FIGS. 1 and 10, compound current two-layer motor 2 constituting first and second motor/generators MG1, MG2, front side planetary gear group GF, center planetary gear group GC, and rear side planetary gear group GR in the order from a side of engine ENG, these components being coaxially arranged in the axial direction. It is noted that, herein, front side planetary gear couple GF, center planetary gear couple GC, and rear side planetary gear group are correlated so as to have three degrees of freedom as will be described below.

Input axle 4 (denoted by Input In in the lever diagrams of FIGS. 12 through 15) through which the revolution of engine ENG is inputted via engine clutch Cin is coupled to ring gear Rr of planetary gear group GR. Carrier Cr of planetary gear group GR is coupled to output axle 5 (denoted by Out in the lever diagram of FIGS. 11 through 14). First motor/generator MG1 (outer rotor 2ro) is coupled to sun gear Sc of planetary gear group GC. Second motor/generator MG2 (inner rotor 2ri) is coupled to ring gear Rf of planetary gear group GF, this ring gear Rf being coupled to ring gear Rc of planetary gear group GC. High clutch Chi is connectable between ring gears Rf, Rc and carrier Cf of planetary gear group GF. This carrier Cf is fixable to low brake $B_{LO}$ and one-way clutch OWC is fixable in the same direction as described above. Sun gear Sf is coupled to sun gear Sr. Carriers Cc, Gr of planetary gear groups GC, GR are mutually coupled together. Furthermore, multi-plate low-and-high brake $B_{LH}$ is installed to enable sun gear Sc coupled to outer rotor 2ro to be fixed is installed.

Lever diagrams of hybrid transmission 1 constructed in FIG. 11 are shown in FIGS. 12 through 15. Input In is coupled to ring gear Rr of planetary gear group GR via engine clutch Cin. Output Out is coupled to mutual coupling body of carriers Cc, Cr of planetary gear groups GC, GR. Sun gear Sr of planetary gear group GR and ring gear Rc of planetary gear group GC are coupled to sun gear Sf and ring gear Rf of the planetary gear group GF, respectively. In addition, low brake $B_{LO}$ is disposed to fix carrier Cf of planetary gear group GF and high clutch Chi is disposed to couple mutually carrier Cf of planetary gear group GF and ring gear Rf thereof. First motor/generator MG1 (outer rotor 2ro) is coupled to sun gear Sc of planetary gear group GC and second motor/generator MG2 (inner rotor 2ri) is coupled to ring gear Rc (ring gear Rf of planetary gear group GF). Sun gear Sc of planetary gear group GC is fixable by means of low-and-high brake $B_{LH}$.

lateral axis shown in each of FIGS. 12 through 15 denotes the distance ratio between revolutional elements determined according to the gear ratio of planetary gear group GC, GR. In details, the distance ratio between ring gear Rr and sun gear Sc is represented by $\alpha$ and the distance ratio between carrier Cr (carrier Cc) and sun gear Sr (ring gear Rc) is represented by $\beta$ when distance between ring gear Rr and carrier Cr (carrier Cc) is 1. The distance ratio between the revolutional elements determined according to the gear ratio in the planetary gear group GF, namely, the distance ratio between carrier Cf and sun gear Sf of the same planetary gear group GF is represented by 6.

Figure 12:
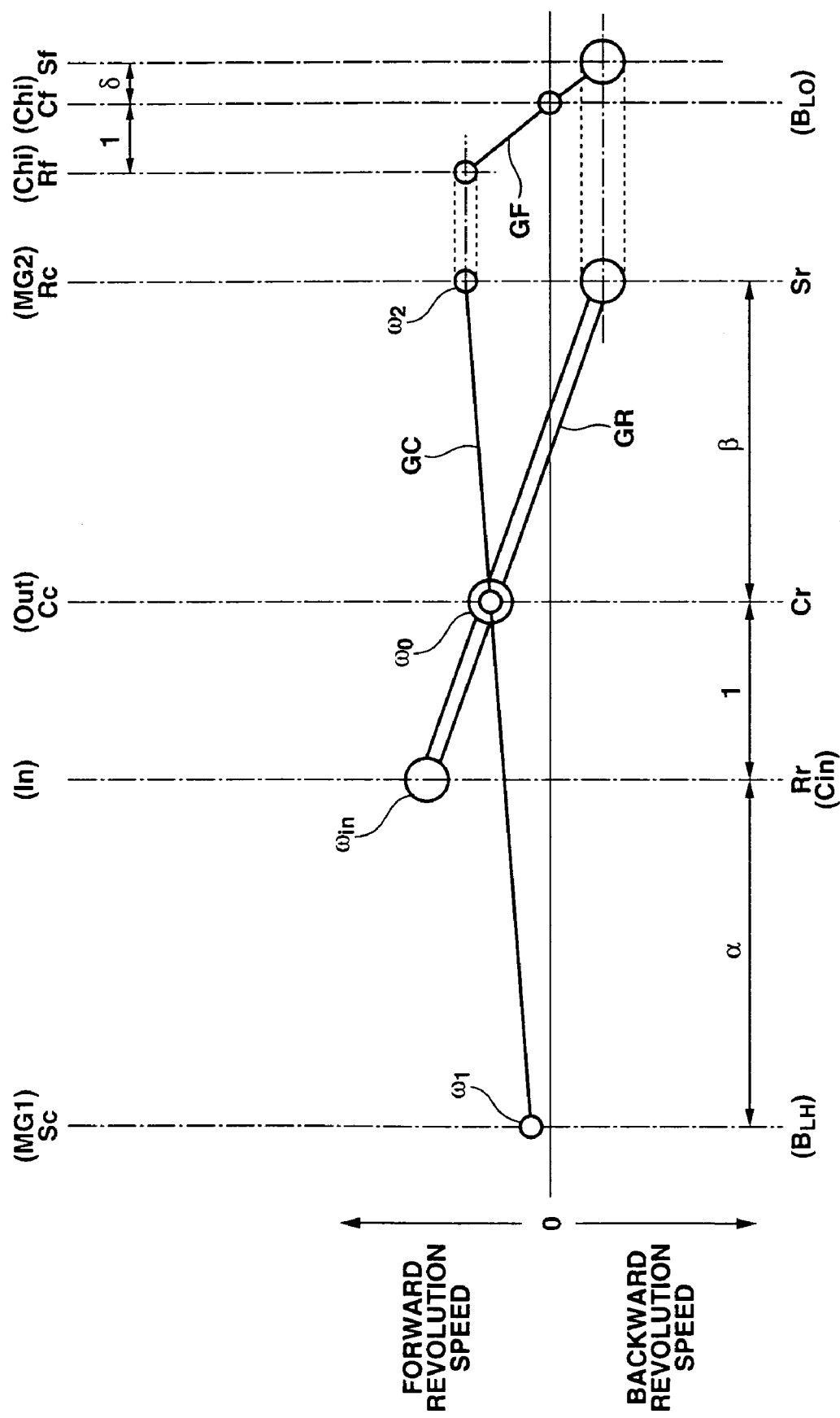
FIG. 12 is a lever diagram of the hybrid transmission shown in FIG. 11 in the low mode.

In the hybrid transmission represented by the lever diagrams of FIGS. 12 through 15, in the low mode with carrier Cf fixed according to the operation of low brake $B_{LO}$, the revolution speed of carrier Cf is zero as shown in FIG. 12. As denoted by lever (denoted by the same sign GF) related to planetary gear group GF, the revolution of sun gear Sr with respect to ring gears Rc, Rf is reverse revolution determined according to the teeth number ratio between ring gear Rf and sun gear Sr. Hence, as appreciated from FIG. 12, revolution speed $\omega_o$ of output Out coupled to carrier Cr is lower than revolution speed $\omega_{in}$ (engine speed inputted via engine clutch Cin) of input In coupled to ring gear Rr. The low mode is used in a region of lower side gear (shift) ratio including the backward gear (shift) ratio than the gear (shift) ratio at which the revolution speeds of ring gears Rc, Rf are zero. Therefore, the low mode is used in a region of lower side gear (shift) ratio including the backward gear ratio than the gear ratio at which the revolution speeds of ring gears Rc, Rf are zeroed.

It is noted that, if revolution speed $\omega_{in}$ of Input In is constant, the positive revolution of ring gear Rf by means of second motor/generator MG2 is increased so that the reverse revolution of sun gear Sf is raised, the reverse revolution of sun gear Sr coupled to sun gear Sf is raised, revolution speed $\omega_o$ of output Out is reduced. Thus, the gear (shift) ratio can be transferred to the low side. Furthermore, the gear (shift) ratio can be transferred from the gear (shift) ratio of low side infinite (stop) to backward gear (shift) ratio.

In the low mode in which low brake $B_{LO}$ is engaged, the controls of first motor/generators MG1, MG2 (the revolution speeds thereof are denoted by $\omega_1$ and $\omega_2$) and of engine ENG freely select the revolution speed ratio between input revolution speed $\omega_{in}$ and output revolution speed $\omega_o$. At the same time, while controlling both gear (shift) ratio and driving force, the output can be determined. This low mode is the continuously variable transmission ratio mode having two degrees of freedom.

In a case where sun gear Sc is fixed with low-and-high mode brake $B_{LH}$ engaged in the low mode, the low side gear ratio can be fixed. At this fixed low side gear ratio, a large driving force which is the addition of engine output ENG and output of second motor/generator MG2 permits the travel in the low-speed, large torque. It is noted that, in this case, if second motor/generator MG2 is acted as the generator, the travel according to the output in which engine output is reduced by second motor/generator MG2 becomes possible. As described above, in a case where low-and-high mode brake $B_{LH}$ is engaged in the low mode, with the revolution speed ratio between input revolution speed $\omega_{in}$ and output revolution speed $\omega_o$ fixed, the power of second motor/generator MG2 can adjustably be outputted with engine power. In this case, even in the low mode, the gear (shift) ratio becomes fixed gear (shift) ratio.

In the variably transmissible low mode at which the operation of low brake $B_{LO}$ causes the fixation of carrier Cf, the operation of high clutch Chi causes the coupling between ring gear Rf and carrier Cf. At this time, the engagement advance of high clutch Chi reduces the revolutions of ring gears Rc, Rf and sun gears Sf, Sr. The lever diagram is directed from the state shown in FIG. 12 to the state of FIG. 14 via the state of FIG. 13. The state enters in FIG. 14 in which revolution speeds of ring gears Rc, Rf and sun gears Sf, Sr are all zeroes. At this time, second (2nd) mode is selected.

Figure 14:
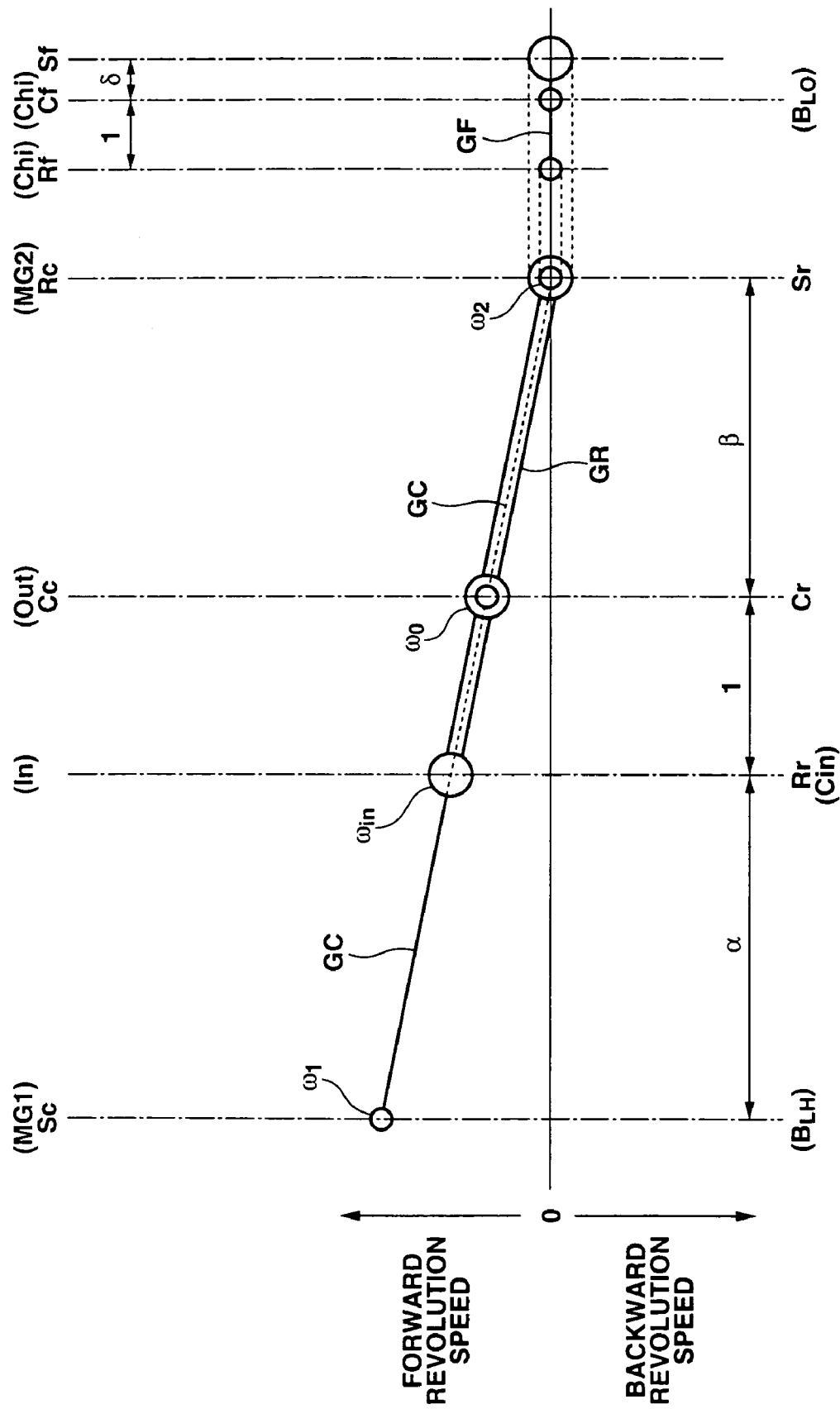
FIG. 14 is a lever diagram of the hybrid transmission shown in FIG. 11 in the second (2nd) mode.

Since, in the second mode shown in FIG. 14, since revolution speeds of sun gear Sr and ring gear Rc are both zeroes, lever GR and lever GC are overlapped to form the lever diagram in the straight line shape having the four-elements, two degrees of freedom and both of sun gear Sr and ring gear Rc are fixed to the position of revolution speed of 0. Hence, the gear ratio is fixed at second (2nd) gear (shift) ratio higher than the case of the low mode. At this fixed second (2nd) gear (shift) ratio, the travel according to the output of engine ENG and/or output of first motor/generator MG1 becomes possible. As described above, in the 2nd (second) mode in which both of low brake $B_{LO}$ and high clutch Chi are engaged, with the revolution speed ratio between input revolution speed ωin and output revolution speed ωo fixed, the power of first motor/generator MG1 can adjustably be outputted with the engine power. This second (2nd) mode is fixed gear (shift) ratio.

When the engagement of high clutch Chi couples between carrier Cf of planetary gear group GF and ring gear Rf thereof, all revolutional elements Sf, Cf, Rf of planetary gear group GF are integrally revolved, if low brake $B_{LO}$ is released. As shown in the lever diagram of FIG. 15, the revolution speed is varied maintaining the state in which sun gear Sr and ring gear Rc are mutually coincident. In this case, as shown in FIG. 15, the lever related to planetary gear group GR (denoted by the same sign as GR) is overlapped on the lever (denoted by the same sign as GC) related to the planetary gear group GC. The gear train constituting planetary gear groups GC, GR is represented by the straight line lever diagram having four elements and two degrees of freedom.

In the high mode at which high clutch Chi is engaged, controls of first and second motor/generators MG1, MG2 (their revolution speeds are denoted by ω1, ω2) and of engine ENG freely select the revolution speed ratio between input revolution speed ωin and output revolution speed ωo. At the same time, the output can be determined while controlling the gear (shift) ratio and the driving force. This high mode is the continuously (infinitely) variable transmission ratio mode. In this high mode, revolution speed ωo of output Out coupled to carriers Cc, Cr is higher than revolution speed ωin of input In coupled to ring gear Rr (engine speed to be inputted via engine clutch Cin). This high mode is used when the continuously variable transmission is required in a region of higher gear (shift) ratio.

In a case where, in the high mode, low-and-high mode brake $B_{LH}$ is engaged and sun gear Sc is fixed via outer rotor 2ro, the higher gear (shift) ratio in the high mode can be fixed. In this fixed higher gear (shift) ratio, a high speed travel by means of only engine ENG becomes possible. Second motor/generator MG2 can assist the driving force and carry out the energy regeneration during the deceleration. The driving performance at the high speed travel and the improvement in the fuel consumption can be compatible. As described above, in a case where, in the high mode, low-and-high mode brake $B_{LH}$ is engaged, the revolution speed ratio between input revolution speed ωin and output revolution ωo is fixed. The power of second motor/generator MG2 is adjustably outputted with the engine power. In this case, even in the high mode, the gear (shift) ratio becomes fixed gear ratio.

The mode switch which is the controlled object of the present invention from the continuously variable transmissible low mode in which the operation of low brake $B_{LO}$ causes carrier Cf to be fixed to the high mode in which the operation of high clutch Chi couples between ring gear Rf and carrier Cf is as follows: At first, high clutch Chi is coupled in the low mode so that the lever diagram is transferred from the state shown in FIG. 12 to the state shown in FIG. 14 via the state of FIG. 13. From the state shown in FIG. 14, low brake $B_{LO}$ is released so that the lever diagram becomes the state shown in FIG. 15. At the same time, the torque control of second motor/generator MG2 to be carried out in association with the engagement advance of high clutch Chi and the release of low brake $B_{LO}$ is carried out so that the mode switch is carried out.

Figure 13:
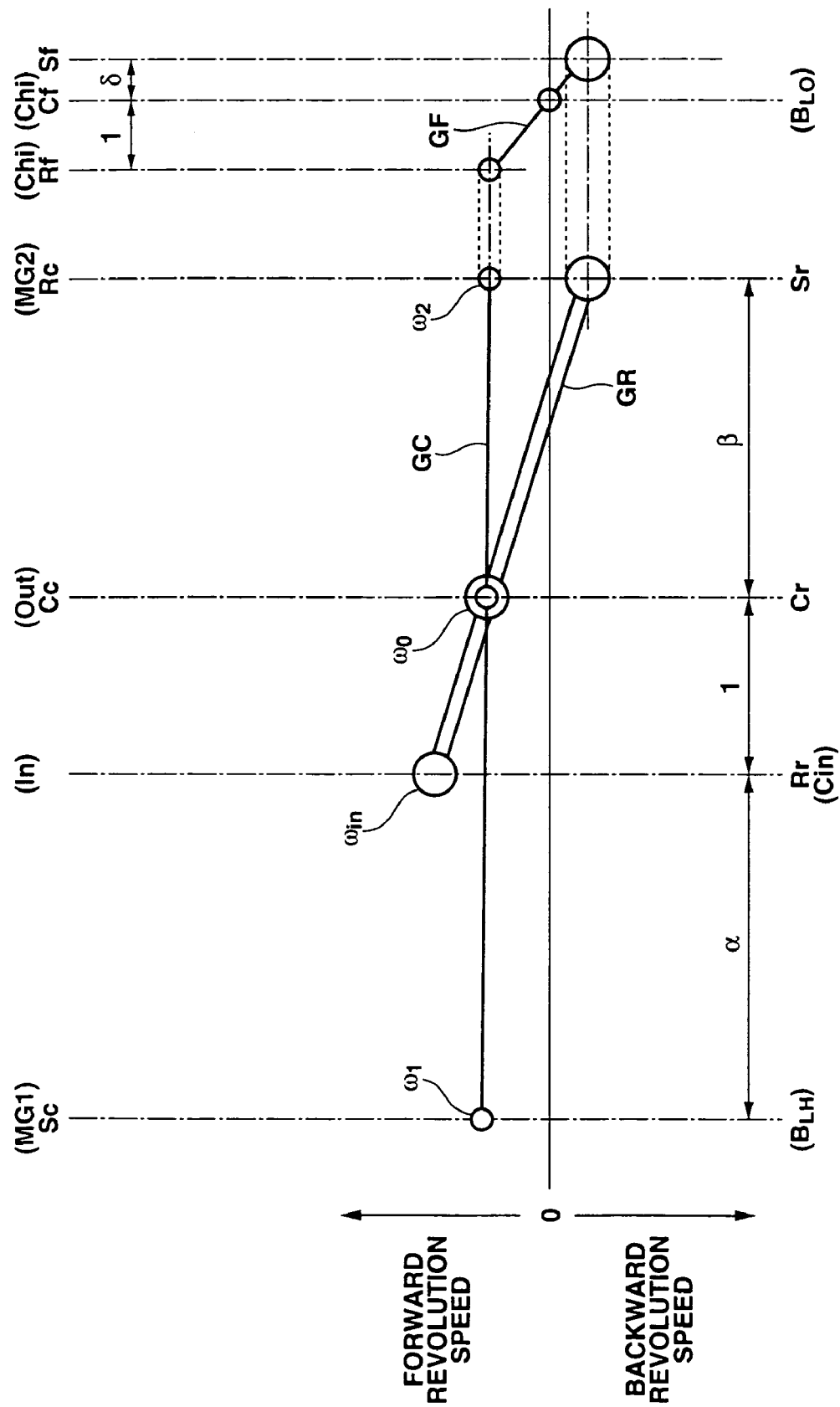
FIG. 13 is a lever diagram of the hybrid transmission shown in FIG. 11 during the mode switch from the low mode to the second (2nd) mode.

While the lever diagram is directed toward the state shown in FIG. 14 via the state of FIG. 13, the torque of second motor/generator MG2 is negative value in the direction at which the torque of second motor/generator MG2 reduces forward revolution speed ω2 and its absolute value is progressively reduced. On the other hand, while the lever diagram is directed from the state shown in FIG. 14 to the state shown in FIG. 15, the torque of second motor/generator MG2 is the positive value in the direction at which forward revolution speed ω2 is raised and its absolute value is progressively increased. Thus, the torque change occurs in second motor/generator MG2 along with the polarity reversal. The torque change of second motor/generator MG2 along with the polarity reversal generates the output torque variation and discontinuity of the change in the gear (shift) ratio. Thus, the smooth mode switch from the low mode to the high mode is prevented so that the reduction of quality of the mode switch is brought out.

To solve the above-described problem, in the case of this hybrid transmission, the similar mode switch control according to each embodiment described with reference to FIGS. 7A through 9B can be adopted. Thus, the same action and advantages can be achieved in the example of FIG. 11.

The entire contents of a Japanese Patent Application No. 2003-420458 (filed in Japan on Dec. 18, 2003) are herein incorporated by reference. The scope of the invention is defined with reference to the following claims.

What is claimed is:

1. A mode switch control apparatus for a hybrid transmission, the hybrid transmission including:
   a differential unit by means of which an engine, an output axle, and at least one motor/generator are mutually linked;
   a clutch by means of which first predetermined revolutional elements of the differential unit are mutually coupled; and
   a brake by means of which second predetermined revolutional elements of the differential unit are fixed and the hybrid transmission being selectable between a low mode which is suitable for a continuously variable transmission in a low side gear area and a high mode which is suitable for the continuously variable transmission in a high side gear ratio area, an output torque of the motor/generator being changed along with a polarity reversal in the motor/generator from a torque required in the low mode to a torque required in the high mode during a mode switch from the low mode to the high mode in a state in which an engine output torque and a transmission output axle torque are substantially invariable, the mode switch control apparatus performing a mutual interlocking control for both of a rise in a transmission torque capacity of one of the clutch and brake which is switched from a release state to an engagement state during the mode switch from the low mode to the high mode to select the high mode and the torque change in the motor/generator along with the polarity reversal.

2. A mode switch control apparatus for a hybrid transmission as claimed in claim 1, wherein the mode switch control apparatus, to perform the mutual interlocking control, commands the transmission torque capacity of one of the clutch and the brake which is for the high mode selection in an open control and performs a feedback control for an output torque of the motor/generator to make a revolution speed within the hybrid transmission follow a target value.

3. A mode switch control apparatus for a hybrid transmission as claimed in claim 1, wherein the mode switch control apparatus, to perform the mutual interlocking control, commands an output torque of the motor/generator in an open loop control and performs a feedback control for the transmission torque capacity of one of the clutch and the brake which is for the high mode selection to make a revolution speed within the hybrid transmission follow a target value.

4. A mode switch control apparatus for a hybrid transmission as claimed in claim 1, wherein the transmission torque capacity of one of the clutch and the brake which is engaged during the low mode selection is reduced in a substantial synchronization with the interlocking control.

5. A mode switch control apparatus for a hybrid transmission as claimed in claim 1, wherein a one-way clutch that functions to perform a low mode selection in place of the clutch and the brake is disposed substantially in parallel to one of the clutch and the brake which is for the low mode selection and one of the clutch and the brake which is for the low mode selection is released in a midway through the mutual interlocking control.

6. A mode switch control apparatus for a hybrid transmission as claimed in claim 2, wherein the revolution speed within the hybrid transmission is an actual gear ratio which is a ratio between input and output revolution speeds of the hybrid transmission and the mode switch control apparatus performs the feedback control for the output torque of the motor/generator to make the actual gear ratio follow a target gear ratio.

7. A mode switch control apparatus for a hybrid transmission as claimed in claim 3, wherein the revolution speed within the hybrid transmission is an actual gear ratio which is a ratio between input and output revolution speeds of the hybrid transmission and the mode switch control apparatus performs the feedback control for the transmission capacity of one of the clutch and the brake which is for the high mode selection to make the actual gear ratio follow a target gear ratio.

* * * * *